(12) United States Patent
Kawanaka et al.

(10) Patent No.: US 11,713,496 B2
(45) Date of Patent: Aug. 1, 2023

(54) POWDER MATERIAL, POWDER MATERIAL FOR ADDITIVE MANUFACTURING, AND METHOD FOR PRODUCING POWDER MATERIAL

(71) Applicant: Proterial, Ltd., Tokyo (JP)

(72) Inventors: Hirotsugu Kawanaka, Tokyo (JP); Hiroshi Shiratori, Tokyo (JP); Shuho Koseki, Tokyo (JP); Tadashi Furuya, Tokyo (JP); Gang Han, Tokyo (JP); Kiyomi Nakamura, Tokyo (JP)

(73) Assignee: Proterial, Ltd., Tokyo (JP)

( * ) Notice: Subject to any disclaimer, the term of this patent is extended or adjusted under 35 U.S.C. 154(b) by 151 days.

(21) Appl. No.: 16/770,756

(22) PCT Filed: Nov. 27, 2018

(86) PCT No.: PCT/JP2018/043475
§ 371 (c)(1),
(2) Date: Jun. 8, 2020

(87) PCT Pub. No.: WO2019/123989
PCT Pub. Date: Jun. 27, 2019

(65) Prior Publication Data
US 2021/0170480 A1 Jun. 10, 2021

(30) Foreign Application Priority Data
Dec. 19, 2017 (JP) .................. 2017-243100

(51) Int. Cl.
*B22F 1/00* (2022.01)
*B22F 1/02* (2006.01)
(Continued)

(52) U.S. Cl.
CPC .............. *C22C 29/065* (2013.01); *B22F 1/06* (2022.01); *B22F 1/10* (2022.01); *B22F 1/142* (2022.01);
(Continued)

(58) Field of Classification Search
CPC ....................................................... B33Y 70/10
See application file for complete search history.

(56) References Cited

U.S. PATENT DOCUMENTS

| | | |
|---|---|---|
| 4,395,279 A | 7/1983 | Houck |
| 2007/0087205 A1 | 4/2007 | Jarosinski et al. |

(Continued)

FOREIGN PATENT DOCUMENTS

| | | |
|---|---|---|
| CN | 1377857 A | 11/2002 |
| CN | 106270493 A | 1/2017 |

(Continued)

OTHER PUBLICATIONS

Machine translation JP-2001181776-A (Year: 2001).*

(Continued)

*Primary Examiner* — Alexandre F Ferre
(74) *Attorney, Agent, or Firm* — Volpe Koenig

(57) ABSTRACT

The present disclosure provides a powder material that makes it possible to achieve higher flowability than before and to increase the crushing strength of particles. The powder material of the present disclosure has a dendritic structure 1. The dendritic structure 1 has a cemented carbide composition or a cermet composition.

16 Claims, 25 Drawing Sheets

(51) Int. Cl.
*C22C 29/08* (2006.01)
*B22F 9/08* (2006.01)
*B33Y 70/10* (2020.01)
*C22C 29/06* (2006.01)
*B22F 1/16* (2022.01)
*B22F 1/142* (2022.01)
*B22F 1/10* (2022.01)
*B22F 1/06* (2022.01)

(52) U.S. Cl.
CPC ............... *B22F 1/16* (2022.01); *B22F 9/082* (2013.01); *B33Y 70/10* (2020.01); *C22C 29/08* (2013.01); *B22F 2301/15* (2013.01); *B22F 2302/10* (2013.01); *B22F 2304/10* (2013.01); *Y10T 428/2982* (2015.01)

(56) References Cited

U.S. PATENT DOCUMENTS

| 2016/0145723 | A1 | 5/2016 | Chen |
| 2017/0072469 | A1 | 3/2017 | Maderud et al. |
| 2017/0251713 | A1* | 9/2017 | Warner .................. A23P 30/20 |
| 2019/0111520 | A1 | 4/2019 | Ogata et al. |

FOREIGN PATENT DOCUMENTS

| JP | 53-127382 | A2 | | 11/1978 |
| JP | 61-261406 | A | | 11/1986 |
| JP | 2001181776 | A | * | 7/2001 |
| JP | 2009-066741 | A | | 4/2009 |
| JP | 2016-160500 | A | | 9/2016 |
| JP | 2016-172904 | A | | 9/2016 |
| JP | 2017-519101 | A | | 7/2017 |
| WO | 2017/130283 | A1 | | 8/2017 |
| WO | 2017/195695 | A1 | | 11/2017 |

OTHER PUBLICATIONS

Extended European Search Report dated Jul. 14, 2021 for European Patent Application No. 18893050.7.
Singapore Written Opinion dated Oct. 20, 2020 for Singapore Patent Application No. 11202004060S.
International Search Report, PCT/JP2018/043475, dated Jan. 15, 2019, 2 pgs.
Communication pursuant to Article 94(3) EPC dated Apr. 11, 2022 for European Patent Application No. 18893050.7.
Chinese Office Action dated May 12, 2022 for Chinese Patent Application No. 201880071899.2.
"dendrite", "Electromechanical Dictionary", Shanghai Jiao Tong University, ed.,China Machine Press, p. 699, Oct. 1991 (Please refer to English concise explanation of the relevance provided by enclosed English translation of Chinese Office Action dated May 12, 2022 for Chinese Patent Application No. 201880071899.2).

\* cited by examiner

50 μm

10 μm

POWDER MATERIAL, POWDER MATERIAL FOR ADDITIVE MANUFACTURING, AND METHOD FOR PRODUCING POWDER MATERIAL

TECHNICAL FIELD

The present invention relates to a powder material for, e.g., additive manufacturing, an additive manufacturing powder material, and a powder material manufacturing method.

BACKGROUND ART

Conventionally, an invention relating to a granule for layer-by-layer fabrication and a method of manufacturing the granule is known. The granule is most suitable for forming a layer-by-layer fabricated body of a WC-based cemented carbide (a sintered body of WC-based cemented carbide) by irradiating WC-based cemented carbide particles, spread to a predetermined thickness, with an electron beam to partially melt and then solidify the particles (see Patent Literature 1 indicated below).

The granule for layer-by-layer fabrication described in Patent Literature 1 is formed by granulating and sintering a raw material powder for WC-based cemented carbide, and is used for layer-by-layer fabrication using an electron beam. The granule is characterized in that the median particle size is 60 to 130 μm and under at least 150 μm, and that the flowability measured in accordance with JISZ2502 is 10 to 25 sec/50 g (refer to claim 1, for example, of the literature).

An invention relating to a WC-based cemented carbide which has high hardness and excellent high temperature strength and that makes it possible to suppress deformation during manufacture, and a method of manufacturing the same have also been disclosed (see Patent Literature 2 indicated below).

The WC-based cemented carbide described in Patent Literature 2 comprises tungsten carbide particles bonded together by a binder phase of cobalt or a cobalt alloy. The hardness of the WC-based cemented carbide is from 400 to 800 HV. Further, the content of the cobalt or cobalt alloy in the WC-based cemented carbide is 35 to 50 mass %. In a cross-sectional structure of the WC-based cemented carbide, the median particle size of the tungsten carbide particles is 0.4 to 1.0 μm in equivalent circle diameter. In a cross-sectional structure of the WC-based cemented carbide, the diameter of the maximum inscribed circle that can be drawn in the binder phase of the cobalt or cobalt alloy in a region not including the tungsten carbide particles is 5 to 30 μm (see claim 1, for example, of the literature).

The manufacturing method described in Patent Literature 2 is a method of manufacturing the WC-based cemented carbide. The conventional manufacturing method is characterized by solidifying a mixture powder in which a raw material powder of tungsten carbide with D50, which is the median particle size at 50% integrated value, of 0.4 to 1.0 μm is attached to a surface of a raw material powder of cobalt or cobalt alloy with D50 of 1 to 50 μm (see claim 2, for example, of the literature).

CITATION LIST

Patent Literature

Patent Literature 1: JP 2016-172904 A
Patent Literature 2: JP 2016-160500 A

SUMMARY OF INVENTION

Technical Problem

The granule for layer-by-layer fabrication described in Patent Literature 1 and the mixture powder used in the manufacturing method according to Patent Literature 2 have irregularities formed on the particle surface of the granule or powder. Accordingly, when the conventional granule or mixture powder is used as the material for the powder bed fusion type of additive manufacturing, for example, the material may be spread in a non-uniform manner due to low flowability, and the accuracy of the shape of the article fabricated by additive manufacturing may be decreased.

In addition, the conventional granule and mixture powder have a problem in the binding force between cobalt (Co) and WC in the particles. Accordingly, if the conventional granule or mixture powder is used as the material for the additive manufacturing as noted above, the particles may be crushed when the material is spread.

The present invention provides a powder material, an additive manufacturing powder material, and a powder material manufacturing method that make it possible to achieve higher flowability than before and to increase the crushing strength of particles.

Solution to Problem

A powder material of the present invention has a dendritic structure. The dendritic structure has a cemented carbide composition or a cermet composition.

A powder material of the present invention has a cemented carbide composition or a cermet composition, and has an uppermost surface having a film including 50 at % or more of carbon.

Advantageous Effects of Invention

According to the present invention, it is possible to provide a powder material, an additive manufacturing powder material, and a powder material manufacturing method that make it possible to achieve higher flowability than before and to increase the crushing strength of particles.

DESCRIPTION OF EMBODIMENTS

In the following, embodiments of a powder material, an additive manufacturing powder material, and a powder material manufacturing method of the present invention will be described with reference to the drawings.

First Embodiment

Figure 1A:
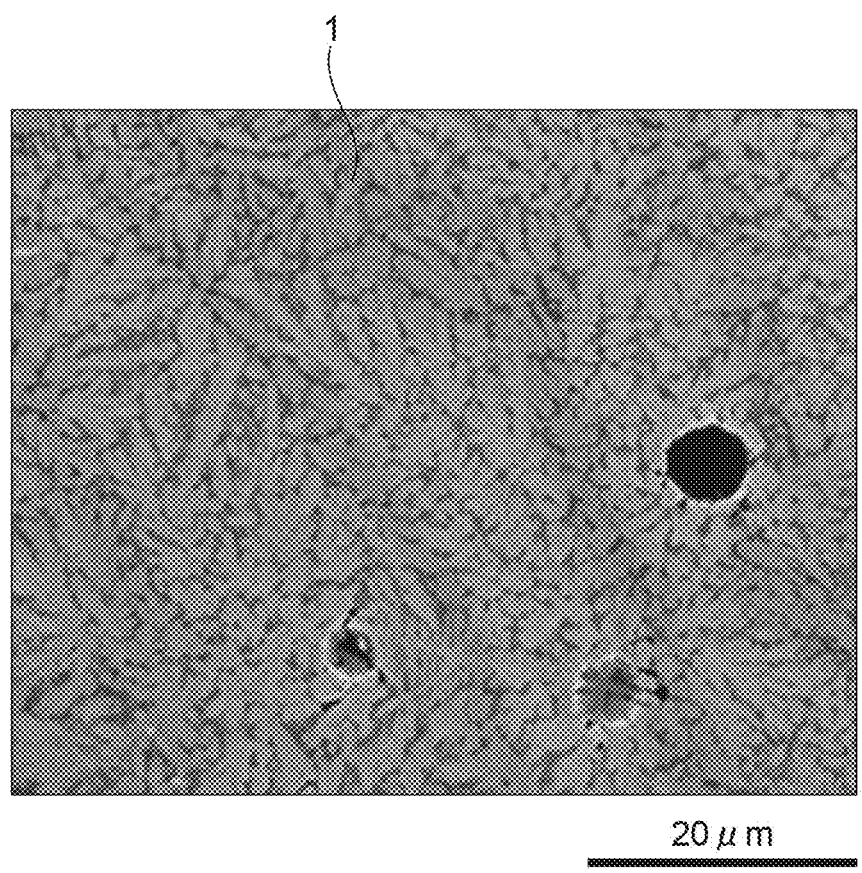
FIG. 1A is a magnified photograph of a particle cross section of a powder material according to a first embodiment of the present invention.
Figure 1B:
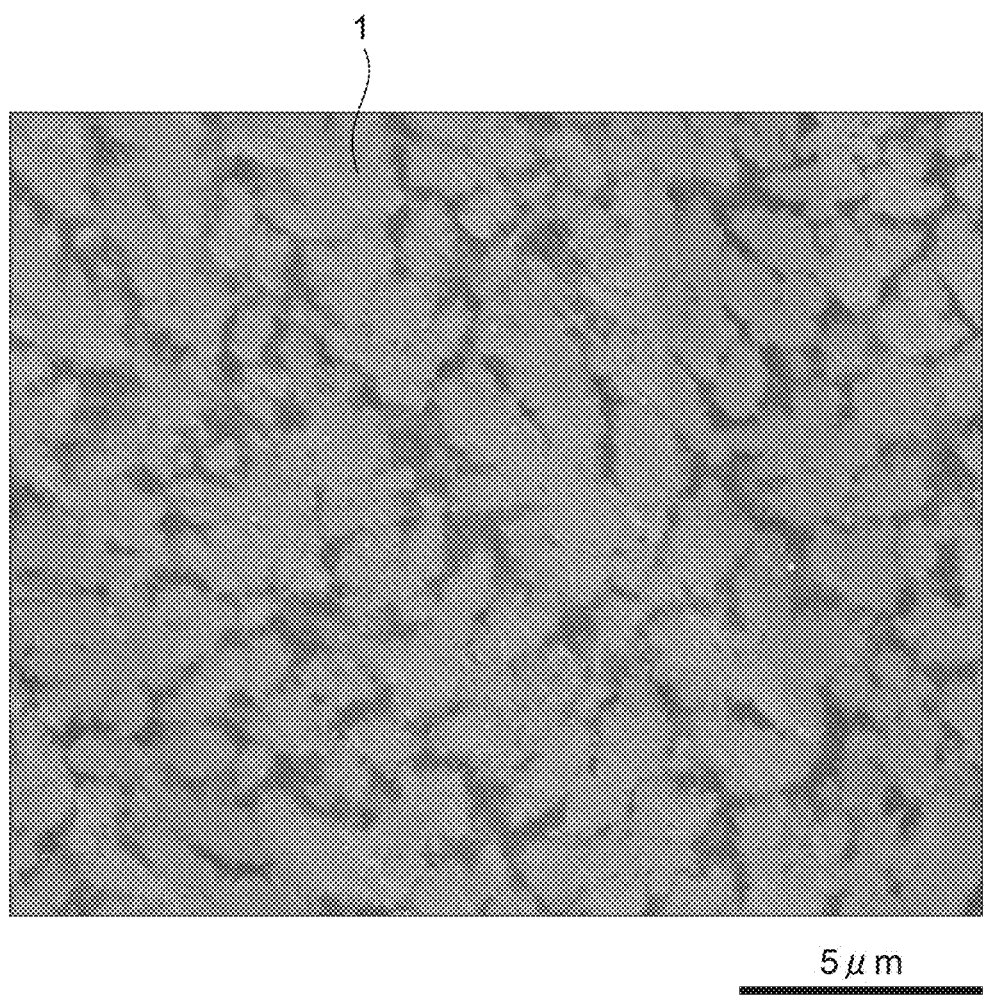
FIG. 1B is a magnified photograph of the particle cross section of the powder material according to the first embodiment of the present invention.

FIG. 1A and FIG. 1B are magnified photographs of a particle cross section of a powder material according to a first embodiment of the present invention. The photograph of FIG. 1A has a magnification factor of 1000, and the photograph of FIG. 1B has a magnification factor of 5000. The particle cross section of the powder material can be observed by, for example, polishing a resin having the powder material embedded therein and thereby exposing the cross section of the particle on the resin surface.

The powder material of the present embodiment has a dendritic structure 1. While a powder is generally an assembly of particles, herein a powder may mean the particles constituting the powder. That is, the powder material of the present embodiment includes particles having the dendritic structure 1. The dendritic structure 1 is, for example, a dendritic crystal having a plurality of branches, i.e., a dendrite. In the example illustrated in FIG. 1A and FIG. 1B, the light-colored portions of the particle cross section having high lightness corresponds to the dendritic structure 1. The dendritic structure 1 has a cemented carbide composition or a cermet composition.

The powder material of the present embodiment is composed of the dendritic structure having a cemented carbide composition or a cermet composition, for example. The cemented carbide composition in the present embodiment refers to a configuration which includes W and carbon, the balance being at least one selected from Fe, Ni, Co, and Cr. The cermet composition refers to a configuration which includes at least one of a Group 4 transition metal, a Group 5 transition metal, a Group 6 transition metal except for W, Al, and Si, and at least one of oxygen, carbon, and nitrogen, the balance being at least one selected from Fe, Ni, Co, and Cr. A preferable powder material composition includes at least one from W, Ti, and Si. The composition of material added to the powder material may be a simple metal element or in the form of a compound such as a carbide, and is added to adjust the material composition of the powder material. The material added to the powder material is not particularly limited.

The dendritic structure 1 of the powder material contains, for example, at least 5 at % of at least one selected from a Group 4 transition metal, a Group 5 transition metal, and a Group 6 transition metal. While the upper limits for the content rates of the Group 4 transition metal, the Group 5 transition metal, and the Group 6 transition metal are not particularly limited, an upper limit of not more than 60 at % may be set. The powder material composition may be measured with, for example, a measurement device using X-ray photoelectron spectroscopy (XPS).

The powder material of the present embodiment has a particle size (particle size distribution range) of 10 μm or more and 200 μm or less, for example, and a flowability in accordance with JIS Z 2502 of 25 sec/50 g or less. The powder material may be sieved to obtain an appropriate median particle size from the particle size range. The particle size of the powder material and the range of particle size may be measured with, for example, a laser diffracting/scattering particle size distribution measurement device. During a test in accordance with JIS Z 2502, the time it takes for 50 grams of powder to pass through a funnel is measured to evaluate the flowability of powder material.

Preferably, the particle size of the powder material is 30 μm or more, and more preferably is 45 μm or more, for example. More preferably, the upper limit of the particle size of the powder material is 130 μm.

The powder material of the present embodiment may be used as an additive manufacturing powder material, for example. In other words, the additive manufacturing powder material of the present embodiment includes the powder material described above. Specifically, when the powder material of the present embodiment is included in the additive manufacturing powder material by 30 vol % or more, and more preferably 40 vol % or more, of the entire amount, it is possible to obtain advantageous effects during layer-by-layer fabrication. Additive manufacturing is a process in which an object is built from a numerical representation of a three-dimensional shape by attaching material. In many cases, the process is achieved by stacking one layer upon another, in contrast to subtractive manufacturing methods (ASTM F2792-12a). Additive manufacturing is a type of near net shape processing in which material is processed into a shape close to the final shape with little surface finishing.

The additive manufacturing powder material of the present embodiment may be used, for example, as a material for the powder bed fusion type of additive manufacturing. The powder bed fusion type is a system whereby a certain region in which a material powder is spread is selectively fused by means of thermal energy. Representative examples include laser sintering, selective laser melting, and electron beam melting techniques.

Figure 5:
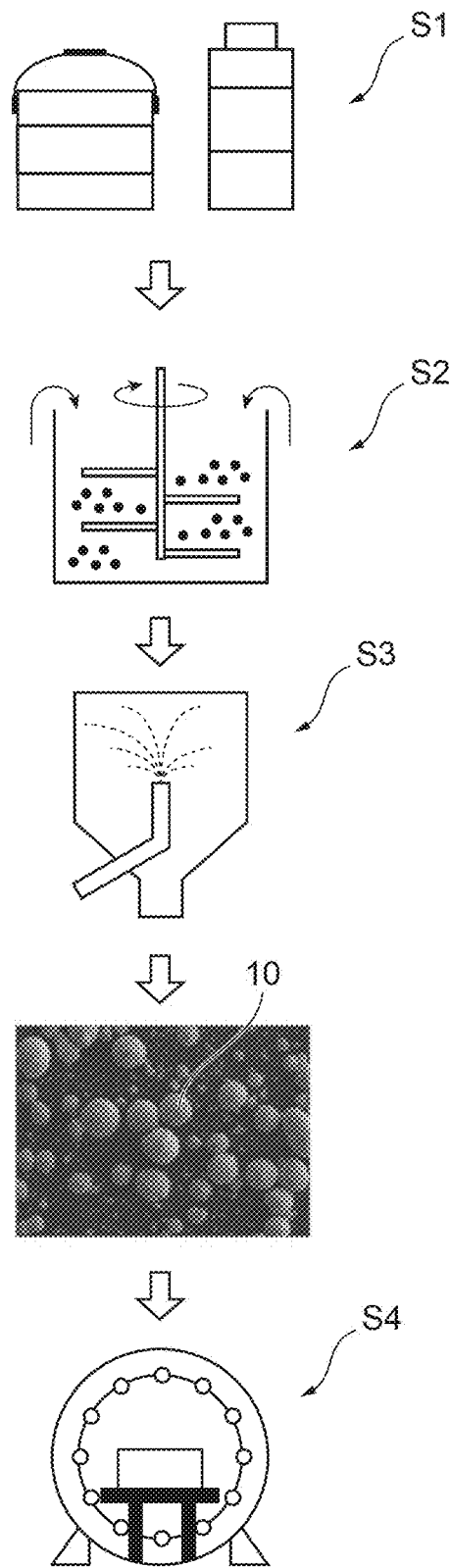
FIG. 5 is an explanatory diagram illustrating part of a powder material manufacturing step.

FIG. 5 is an explanatory diagram for describing some of the steps of the powder material manufacturing method. The powder material of the present embodiment can be manufactured by, for example, a manufacturing method including the following steps. First, in a raw material preparation step S1, as the raw materials, ceramics fine particles, metal or alloy fine particles, and additive materials are prepared in accordance with the composition of the powder material to be manufactured.

The above-described ceramics fine particles are selected from an oxide, a carbide, a nitride, an oxycarbide, an oxynitride, a carbonitride, and an oxycarbonitride of at least one of Groups 4, 5, and 6 transition metals, Si, and Al. Preferable ceramics fine particles are selected from at least one of tungsten carbide (WC), titanium carbide (TiC), silicon carbide (SiC), vanadium carbide (VC), alumina ($Al_2O_3$), titania ($TiO_2$), zirconia ($ZrO_2$), silicon nitride ($Si_3N_4$), and aluminum nitride (AlN). The particle size of the ceramics fine particles at D50, which is the median particle size at 50% integrated value, is 5 µm or less and is preferably 0.1 µm or more and 1.0 µm or less, for example. Preferable metal or alloy fine particles are selected from at least one of Fe, Ni, Co, and Cr. The particle size of the metal or alloy fine particles at D50 is 1.0 µm or more and 50.0 µm or less, for example. The particle size of the additive material at D50 is 0.1 µm or more and 1.0 µm or less, for example. Examples of the additive material include Be, B, Mg, Al, Si, Ti, Mn, Cu, and Zn.

Then, in a raw material mixing step S2, the raw materials prepared in the raw material preparation step S1 are wet-mixed with a wax such as paraffin. Then, in a granulation step S3, the mixture of the raw materials and wax obtained by mixing in the raw material mixing step is granulated by being atomized and dried with a spray drier, producing mixture particles.

Then, in a sintering step S4, a powder 10 of the mixture obtained by granulation in the granulation step S3 is fed into a drying furnace, debound, and then sintered at a sintering temperature at or above 1000° C. Preferably, the debinding temperature is greater than or equal to 400° C. and lower than or equal to 600° C. The debinding temperature is the temperature at which the wax used can be removed. The sintering temperature is the temperature for solidifying the mixture powder particles.

For the debinding temperature and the sintering temperature in the sintering step S4, appropriate conditions are selected in accordance with the combination of the raw materials. By subjecting the mixture powder 10 to the debinding process in the sintering step S4, it is possible to prevent generation of a defect during additive manufacturing. The mixture powder 10 that has been debound cannot be used for additive manufacturing as is. This is because the powder particles fracture during the feeding of the powder 10. Accordingly, in the sintering step S4, after the temperature has been increased to the debinding temperature, the temperature is further increased to the sintering temperature to solidify the mixture powder particles. Further, after the sintering step S4, a high-temperature processing step is implemented, which is not illustrated.

In the high-temperature processing step, the mixture powder 10 solidified in the sintering step S4 is subjected to high-temperature processing by thermal plasma-droplet-refining (PDR) in which the mixture powder 10 is passed through a high temperature region, such as a plasma, whereby all or some of the powder particles are instantaneously melted and solidified.

Through the above-described steps, the powder material of the present embodiment having the dendritic structure 1 is manufactured. As described above, the mixture powder 10 that has been dewaxed and solidified through the sintering step S4 is instantaneously heated, melted, and solidified, whereby the particle shape of the powder material becomes a nearly perfectly spherical shape due to surface tension, and the particle surface becomes smooth.

In order to manufacture the powder material of the present embodiment having the dendritic structure 1, it is preferable to perform the PDR under conditions such that the mixture powder is melted with a high output of 10 kW or more and 40 kW or less in the high-temperature processing step. Preferably, the lower limit of the supplied electric power during PDR is 15 kW. More preferably, the output of the PDR in the high-temperature processing step may be 25 kW or more and 35 kW or less.

In the following, the function of the powder material and the additive manufacturing powder material of the present embodiment will be described.

The powder material of the present embodiment, as described above, has the dendritic structure 1. The dendritic structure 1 of the powder material has a cemented carbide composition or a cermet composition. The powder material having the dendritic structure 1, compared to conventional powder materials, has less particle surface irregularities, has a smooth particle surface, and is more nearly perfectly spherical in particle shape. Accordingly, when the powder material of the present embodiment, or the additive manufacturing powder material of the present embodiment including the powder material, is used for the powder bed fusion type of additive manufacturing, for example, it is possible to obtain higher flowability than from that of conventional powder materials, and to spread the powder material in a more uniform manner.

Further, the powder material of the present embodiment having the dendritic structure 1 and the additive manufacturing powder material including the same have a relatively uniform composition inside the powder particles. Accordingly, it is possible to melt the powder material uniformly during the manufacture of a fabricated object by additive manufacturing, making it possible to suppress variations in the size of a molten pool formed by the melting of the powder material, and to achieve stable formation of the molten pool. As a result, it becomes possible to increase the shape accuracy of the fabricated object manufactured by additive manufacturing and to achieve surface smoothing. Thus, the powder material and the additive manufacturing powder material of the present embodiment provides the excellent effect of enabling the manufacture of a fabricated object with high accuracy by additive manufacturing.

Meanwhile, a conventional material powder that does not have the dendritic structure 1, compared to the powder material of the present embodiment, has larger irregularities formed on the particle surface. Accordingly, if the conventional material powder is used as the material for the powder bed fusion type of additive manufacturing, for example, the material powder will be spread in a non-uniform manner due to the irregularities on the particle surface, possibly resulting in a decrease in the shape accuracy of the article fabricated by additive manufacturing.

In addition, if a conventional material powder composed of the two phases of WC and Co is used as the material for the powder bed fusion type of additive manufacturing, in the process of the material powder melting and forming a molten pool, material powders having different melting points will be melted together, and thereafter a fabricated object having a dendritic structure of a relatively uniform composition will be formed. Because this process occurs due to heat input and heat release in an extremely short time, composition unevenness is caused in minute regions of the article fabricated by additive manufacturing. This makes the size of the molten pool formed by the melting of the material powder non-uniform, and interferes with stable formation of the molten pool. As a result, the problems of a decrease in the shape accuracy of the fabricated object manufactured by additive manufacturing and surface irregularities are caused.

Further, the conventional material powder has an issue in terms of binding force between Co and WC in the particles. Accordingly, if the conventional material powder is used as the material for the powder bed fusion type of additive manufacturing, the material powder particles may be crushed when the material powder is spread. In addition, if the conventional material powder is used for a blasting process for the fabricated object after additive manufacturing, the particles may be crushed. If the material powder particles are crushed, scattering of fine particles becomes a problem.

In contrast, the powder material of the present embodiment has the dendritic structure 1, whereby, compared to the conventional material powder, the particle strength is increased. More specifically, the dendritic structure 1 of the powder material is formed, for example, through a high-temperature and instantaneous melting and solidification process, such as PDR. Due to this process, all or some of the powder material particles melt and solidify, whereby, in addition to the spheroidization of the particle shape and particle surface smoothing as noted above, the crushing strength of the particles is increased. Thus, according to the present embodiment, a powder material and an additive manufacturing powder material can be provided which make it possible to achieve higher flowability than before and to increase the crushing strength of particles.

Also, the powder material of the present embodiment has a cemented carbide composition or a cermet composition. Accordingly, by using the powder material for the powder bed fusion type of additive manufacturing, it becomes possible to manufacture a fabricated object, such as a die made from ceramics and metal materials, more easily.

More specifically, fabricated objects such as a die having the material composition of cemented carbide or cermet have conventionally been manufactured by sintering a material powder of ceramics and metal. However, by using the additive manufacturing powder material including the powder material of the present embodiment having a cemented carbide or cermet composition for additive manufacturing, it is possible to facilitate the manufacture of a fabricated object having the material composition of cemented carbide or cermet, and to increase the freedom of shaping. A cermet is a material in which a powder of a hard compound, such as a metal carbide or nitride, is mixed with a metal binding material.

Preferably, the cemented carbide composition or cermet composition of the powder material of the present embodiment includes at least one of W, Ti, and Si and carbon, the balance being composed of at least one selected from Fe, Cr, Ni, and Co. In this way, it becomes possible to manufacture a fabricated object, such as a die made from a material having the above cemented carbide composition or cermet composition, more easily than before, as described above.

Preferably, the cemented carbide composition or cermet composition of the powder material of the present embodiment contains at least 5 at % or more of at least one of a Group 4 transition metal, a Group 5 transition metal, a Group 6 transition metal, Si, and Al, and at least one of oxygen, carbon, and nitrogen. In this way, it becomes possible to manufacture a fabricated object, such as a die made from a material which has a cemented carbide composition or a cermet composition and which has a mixture composition containing at least 5 at % or more of such ceramics constituent elements, more easily than before, as described above.

The powder material of the present embodiment has a particle size of 10 μm or more and 200 μm or less, and a flowability in accordance with JIS Z 2502 of not more than 25 sec/50 g. The powder material of the present embodiment with such characteristics is particularly suitable as a material for the powder bed fusion type of additive manufacturing. When the particle size of the powder material is 45 μm or more, for example, even when the powder material is used for the powder bed fusion type of additive manufacturing by the electron beam melting process, it is possible to prevent the powder material from being blown off by the irradiating energy of the electron beam. Further, when the particle size of the powder material is 45 μm or more and 130 μm or less, for example, it is possible to obtain a powder material suitable for the powder bed fusion type of additive manufacturing by the electron beam melting process.

When the particle size of the powder material is 10 μm or more and 130 μm or less, for example, it is possible to obtain a powder material suitable for the powder bed fusion type of additive manufacturing using a laser beam as a heat source, such as laser sintering and selective laser melting. Further, when the particle size of the powder material is 30 μm or more and 200 μm or less, it is possible to obtain a powder material suitable for directed energy deposition type of additive manufacturing.

As described above, according to the present embodiment, it is possible to provide a powder material, an additive manufacturing powder material, and a powder material manufacturing method that make it possible to achieve higher flowability than before and to increase the crushing strength of particles.

Second Embodiment

Figure 2A:
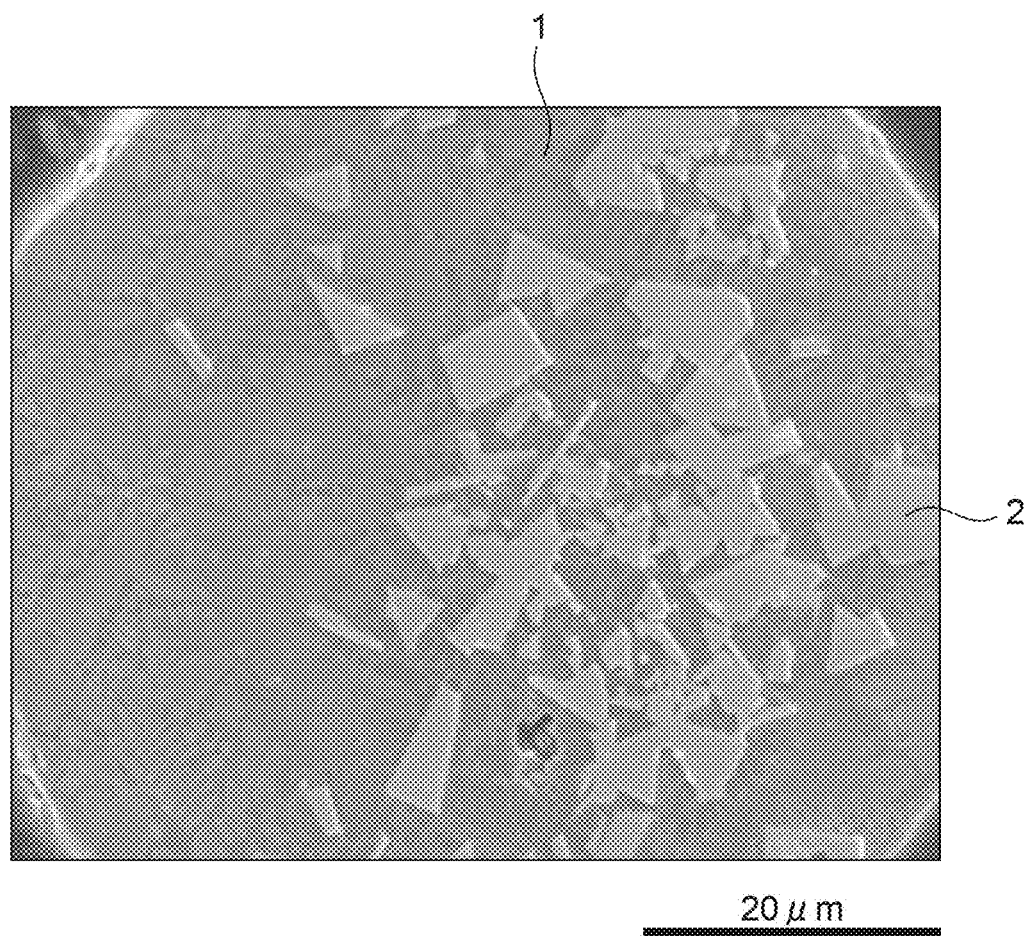
FIG. 2A is a magnified photograph of a particle cross section of a powder material according to a second embodiment of the present invention.
Figure 2B:
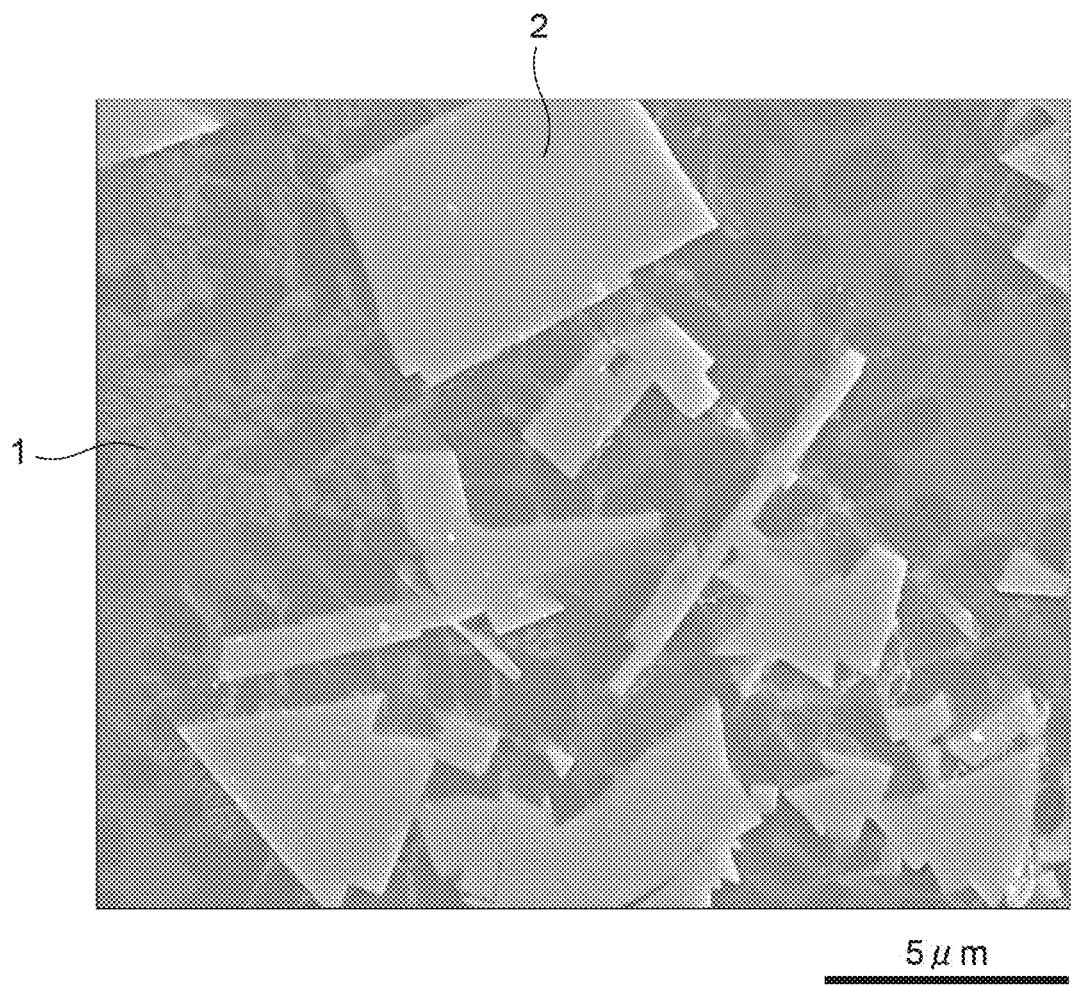
FIG. 2B is a magnified photograph of the particle cross section of the powder material according to the second embodiment of the present invention.

FIG. 2A and FIG. 2B are magnified photographs of a particle cross section of a powder material according to a second embodiment of the present invention. The photograph of FIG. 2A has a magnification factor of 1000, and the photograph of FIG. 2B has a magnification factor of about 5000.

The powder material of the present embodiment includes the dendritic structure 1 and ceramics particles 2 comprising a ceramics composition, and in this point differs from the powder material described in the first embodiment. The method of manufacturing the powder material of the present embodiment is similar to the method of manufacturing the powder material of the first embodiment described above, with the exception of the heat input condition. As a tendency, as the electric power supplied for PDR is decreased, it becomes easier to manufacture the powder material of the present embodiment. In other points, the powder material of the present embodiment is similar to the powder material described in the first embodiment. Accordingly, descriptions of the similar points are omitted, as appropriate.

The powder material of the present embodiment, similarly to the powder material described in the first embodiment, includes the dendritic structure 1, the dendritic structure 1 having a cemented carbide composition or a cermet composition. The shape of the ceramics particles 2 includes various polygonal shapes, as shown in FIG. 2A and FIG. 2B. More specifically, the ceramics particles 2 of various polygonal shapes, such as triangular and square shapes as well as combinations of such shapes are included in the dendritic structure 1. The composition of the ceramics particles 2 is mainly based on the composition of the ceramics fine particles prepared in the raw material preparation step described above. The cemented carbide composition or the cermet composition of the dendritic structure 1 contains at least 5 at % or more of the ceramics constituent elements.

According to the powder material of the present embodiment, it is possible, as with the powder material described in the first embodiment, to provide a powder material and an additive manufacturing powder material that make it possible to achieve higher flowability than before and to increase the crushing strength of the particles.

Fourth Embodiment

Figure 14A:
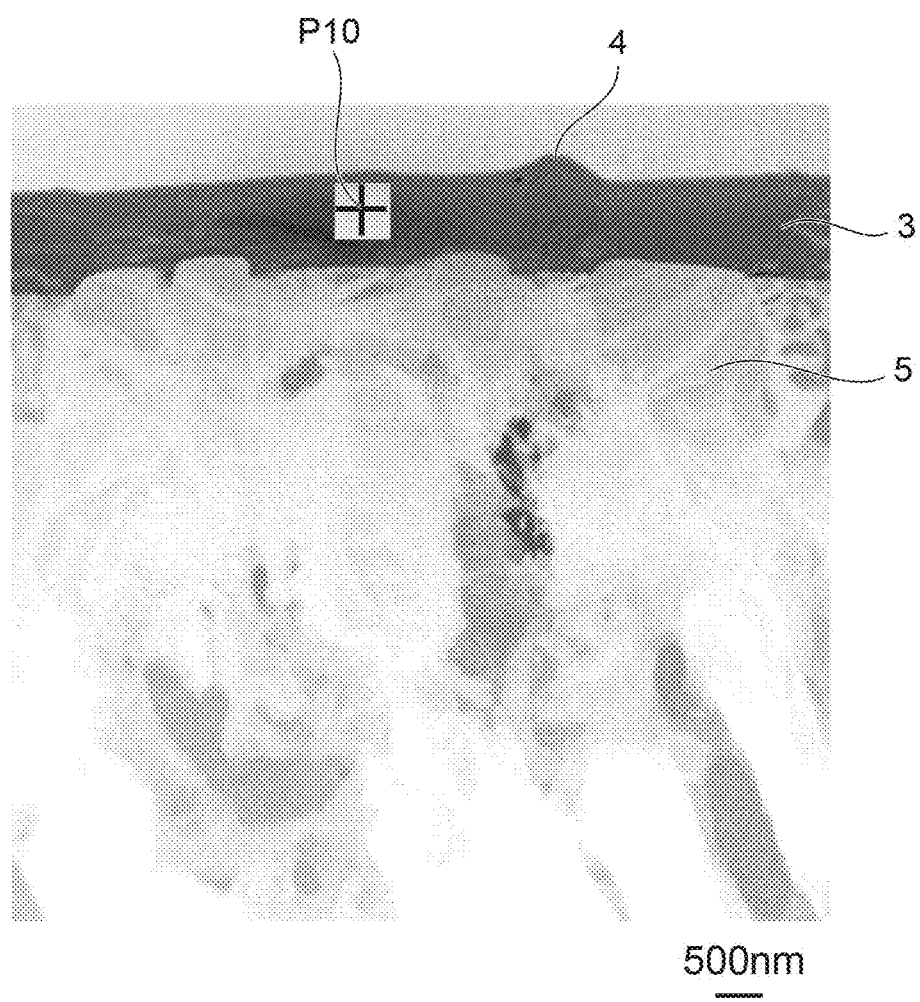
FIG. 14A is a TEM image of a powder material according to the fourth form of the powder material of Example 2.
Figure 14B:
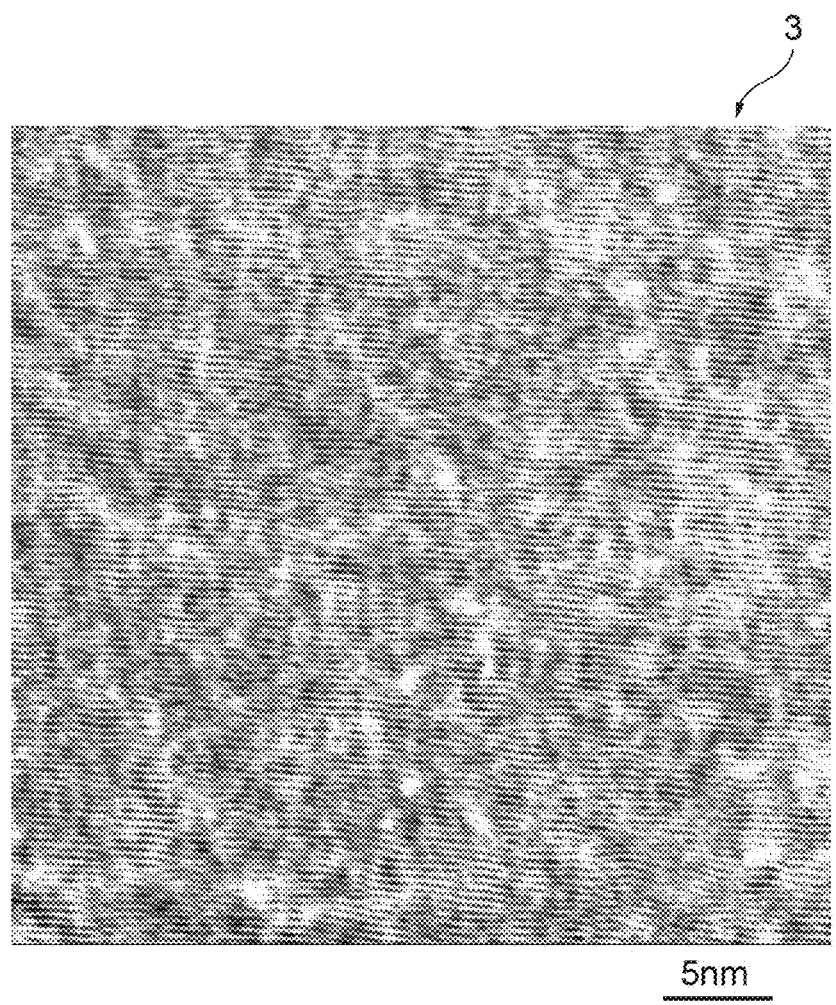
FIG. 14B is a high-resolution TEM image of an outermost layer of a particle of the powder material shown in FIG. 14A.

FIG. 14A is a cross-sectional transmission electron microscope (TEM) image of a particle of a powder material according to a fourth embodiment of the present invention. FIG. 14B is a high-resolution TEM image of an outermost layer of the particle shown in FIG. 14A. The photograph of FIG. 14A has a magnification factor of 3000, and the photograph of FIG. 14B has a magnification factor of 700000.

In FIG. 14A and FIG. 14B, the top of the figures is the surface side of the particle, and the bottom of the figures is the center side of the particle. A sample of the particle shown in FIG. 14A and FIG. 14B can be made by forming a carbon protection film on the particle surface and then thinning to approximately 100 nm by sputtering with a Ga ion beam.

The powder material of the present embodiment, as shown in FIG. 14A, includes a cemented carbide composition or a cermet composition, and has on the uppermost surface an outermost layer 3 which is a film having 50 at % or more of carbon. The carbon included in the outermost layer is preferably 60 at % or more and more preferably 70 at % or more. The composition of the protection film on the powder surface and the outermost layer 3 can be measured by energy dispersive X-ray spectroscopy (EDX), for example. The method of manufacturing the powder material of the present embodiment is similar to the method of manufacturing the powder material of the first embodiment described above. The powder material of the present embodiment is similar in other points to the powder material described in the first embodiment. Accordingly, descriptions of the similar points are omitted, as appropriate.

In the powder material of the present embodiment, the outermost layer 3 formed on the particle uppermost surface is a film including 50 at % or more of carbon, and is a carbon-based film. The carbon amount in the outermost layer 3, i.e., the carbon-based film on the particle surface, may be changed, as appropriate, within a range of 50 at % or more of carbon in accordance with desired characteristics. For example, when it is desired to further improve a powder property such as rolling characteristics, carbon is included preferably by 60 at % or more, more preferably by 70 at % or more, even more preferably by 80 at % or more, and particularly preferably by 90 at % or more. The outermost layer 3 is most preferably composed of nearly 100 at % carbon.

As shown in FIG. 14B, the outermost layer 3, which is a film including 50 at % or more of carbon, has a layered crystal structure along a tangential direction to the surface, for example. In this case, the powder material may include the dendritic structure 1 covered with the film, and the cemented carbide composition or the cermet composition contains at least 5 at % or more of at least one of a Group 4 transition metal, a Group 5 transition metal, a Group 6 transition metal, Si, and Al, and carbon, for example. The cemented carbide composition or the cermet composition may contain at least 5 at % or more of oxygen or nitrogen, for example, and may include a composition in which WC particles are bonded by a bonding layer of Co or a Co alloy.

As noted above, the powder material of the present embodiment is a powder material having a cemented carbide composition or a cermet composition, and includes on the uppermost surface the outermost layer 3, which is a film including 50 at % or more of carbon. Because the outermost layer 3 has a smooth surface, compared to when the outermost layer 3 is not included, it is possible to decrease the friction coefficient of the uppermost surface of the particles. Further, compared to when the powder material does not include the outermost layer 3, it is possible to increase the crushing strength of the particles of the powder material. Thus, according to the present embodiment, even when the powder material includes the outermost layer 3, it is possible to provide a powder material and an additive manufacturing powder material that make it possible to achieve higher flowability than before and to increase the crushing strength of the particles. While the thickness of the outermost layer 3 is not particularly limited, the thickness may be specified to be 20 nm to 5000 nm in order to provide the effect of the carbon film described above in a stable manner. The powder material having the outermost layer 3 can provide the above-described effect of the carbon film when included by 50 vol % or more, more preferably 60 vol % or more, even more preferably 70 vol % or more, and particularly preferably 80 vol % or more with respect to the entire additive manufacturing powder material.

In the powder material of the present embodiment, when the outermost layer 3, which is the film including 50 at % or more of carbon in the uppermost surface, has the layered crystal structure along a tangential direction to the surface, it is possible to further decrease the friction coefficient of the uppermost surface of the particles, and to further improve the flowability of the powder material. This is believed to be because in the outermost layer 3 that is the film including 50 at % or more of carbon, while carbons are bonded together by a relatively strong covalent bond in each of the layers constituting the outermost layer 3, the binding force between the layers is relatively weak, resulting in a cleavage between the layers.

Further, when the powder material of the present embodiment includes the dendritic structure 1 covered with the outermost layer 3 that is the film including 50 at % or more of carbon, it is possible, as described above, to achieve higher flowability and greater particle strength, compared to the conventional material powder.

Even when the powder material includes the outermost layer 3, the dendritic structure may, as described above, have a cemented carbide composition or a cermet composition, and the cemented carbide composition or the cermet composition may contain at least 5 at % or more of at least one of a Group 4 transition metal, a Group 5 transition metal, a Group 6 transition metal, Si, and Al, and carbon. The cemented carbide composition or the cermet composition may contain at least 5 at % or more of oxygen or nitrogen, and may include a composition in which WC particles are bonded by a bonding layer of Co or a Co alloy. In this way, it becomes possible to manufacture a fabricated object, such as a die, made from a material having such compositions, more easily than before.

While embodiments of the present invention have been described in detail with reference to the drawings, specific configurations are not limited to the embodiments, and any design change or the like that does not depart from the spirit of the present invention is included in the present invention. In the following, examples of the powder material of the present invention and comparative examples to be compared with the examples will be described.

Examples and Comparative Examples

Powder materials of Example 1 to Example 3 were manufactured using the manufacturing method described in the foregoing embodiments. Specifically, first, as the raw materials, fine particles of WC having a median particle size D50 of 0.4 μm or more and 1.0 μm or less, and fine particles of a Co alloy of Co and Cr as an additive having a median particle size D50 of 5 μm to 30 μm were prepared. Then, in the raw material mixing step, 2.0 mass % of a paraffin-based compound of n-tetradecane was added as a wax to the raw materials prepared in the raw material preparation step and mixed in an attritor.

Next, in the granulation step, the mixture of raw materials and wax mixed in the raw material mixing step was atomized and dried using a spray drier, producing mixture particles by granulation. When the composition of a powder of the mixture particles obtained by granulation was measured using an XPS measurement device, the composition had 41 mass % of Co and 3.4 mass % of Cr, the balance being WC.

Next, in the sintering step, the mixture particle powder obtained by granulation in the granulation step was fed into a drying furnace and debound at a debinding temperature of 500° C., followed by sintering at a sintering temperature of 1040° C. and, further, in order to improve the binding force of the powder particles, additional sintering was performed at a sintering temperature of 1260° C. Then, the mixture powder particles sintered in the sintering step was instantaneously melted and solidified by PDR in the high-temperature processing step, thereby manufacturing the powder materials of Example 1 to Example 3 of the present invention.

The powder material of Example 1 was manufactured with an electric power of 15 kW supplied for PDR in the high-temperature processing step and under the conditions of the amount of powder fed 100 g, the processing time 37 minutes, plasma gas Ar: 76 L/min, $H_2$: 3 L/min, carrier gas Ar: 4 L/min, and the processing pressure: 0.02 MPa. The powder material of Example 2 was manufactured with an electric power of 18 kW supplied for PDR in the high-temperature processing step. The powder material of Example 3 was manufactured with an electric power of 25 kW supplied for PDR in the high-temperature processing step. The mixture particle powder after the sintering step and before the high-temperature processing step was used as the powder material of Comparative Example 1 to be compared with the powder materials of Example 1 to Example 3.

Next, the powder material of Comparative Example 1 and the powder materials of Example 1 to Example 3 were subjected to flowability evaluation in accordance with JIS Z 2502. Table 1 below shows the results of evaluation of the flowability of the powder material of Comparative Example 1 and the powder materials of Example 1 to Example 3.

TABLE 1

|  | FLOWABILITY [sec/50 g] |
| --- | --- |
| COMPARATIVE EXAMPLE 1 | 27.59 |
| EXAMPLE 1 | 11.99 |
| EXAMPLE 2 | 11.33 |
| EXAMPLE 3 | 10.07 |

As shown in Table 1, the powder material of Comparative Example 1 showed a flowability in excess of 25 [sec/50 g], which is a value not suitable for the powder bed fusion type of additive manufacturing. In contrast, the flowability of the powder materials of Examples 1 to 3 according to the present invention was less than or equal to 25 [sec/50 g], and specifically was in a range of from 10 [sec/50 g] and 12 [sec/50 g] inclusive, indicating values suitable for the powder bed fusion type of additive manufacturing.

Figure 3:
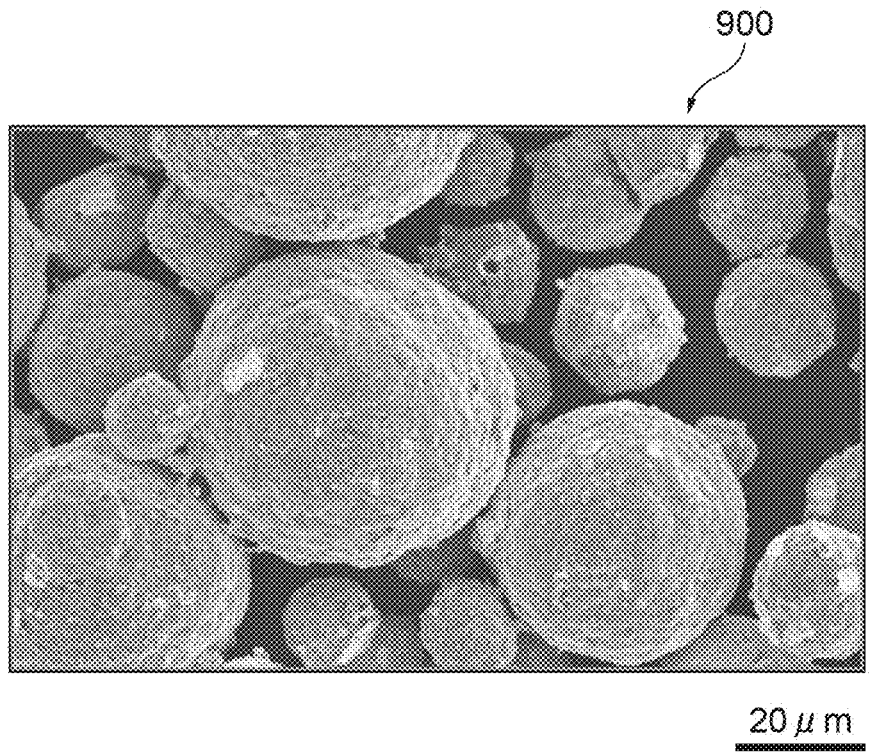
FIG. 3 is a magnified photograph of a powder material of Comparative Example 1.

FIG. 3 is a magnified photograph of the powder material 900 of Comparative Example 1, with a magnification factor of 500. The powder material 900 of Comparative Example 1 had relatively large irregularities formed on the particle surface thereof, had a distorted particle shape with a relatively low sphericity, and also had relatively low particle surface smoothness. It is believed that such powder particle state made the value of the flowability of the powder material 900 of Comparative Example 1 not suitable for the powder bed fusion type of additive manufacturing.

Figure 4A:
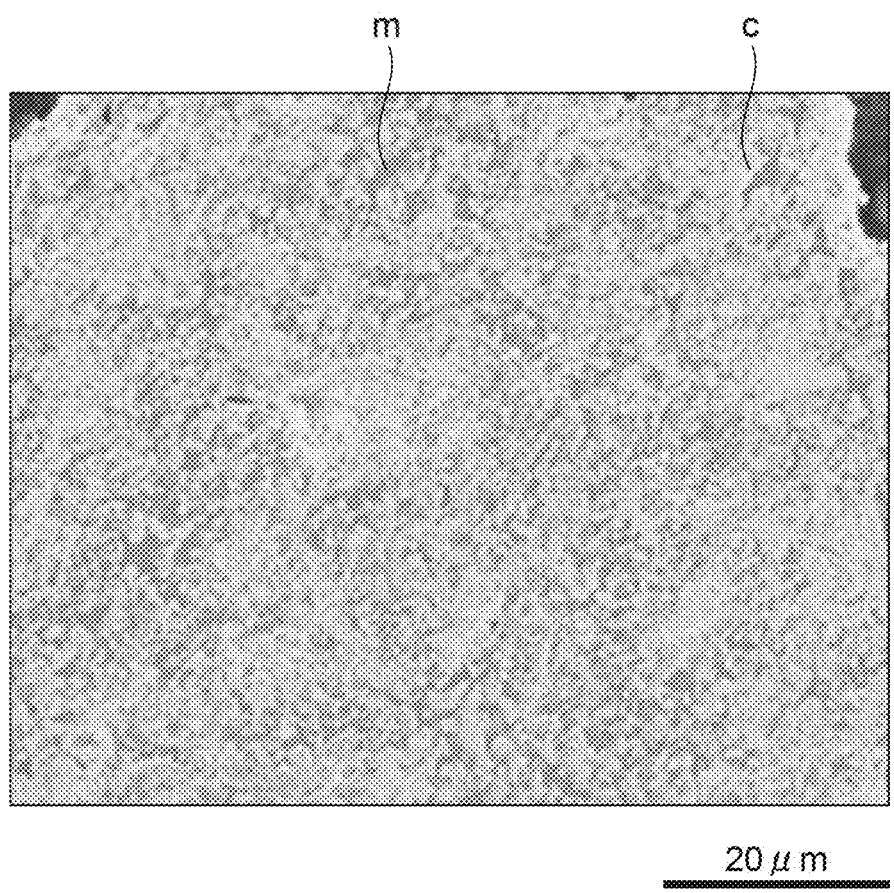
FIG. 4A is a magnified photograph of a particle cross section of the powder material of Comparative Example 1.
Figure 4B:
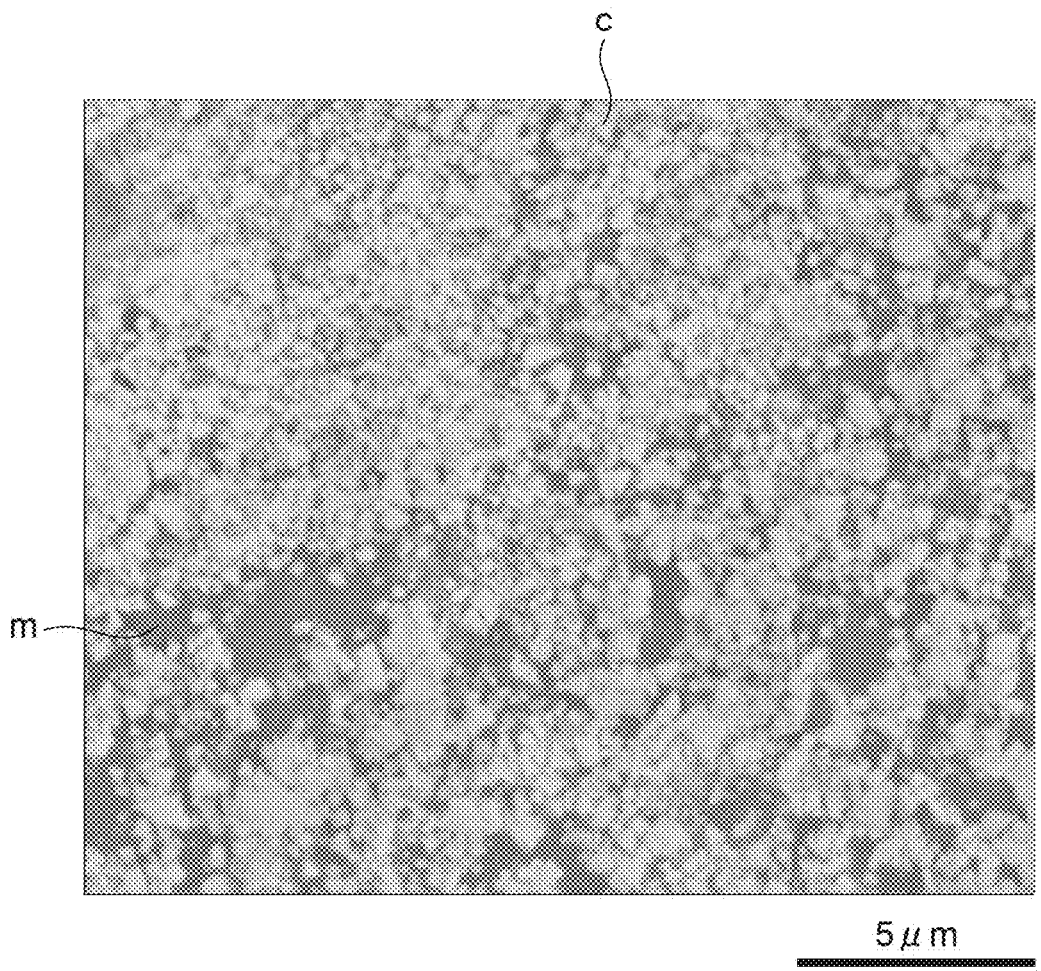
FIG. 4B is a magnified photograph of the particle cross section of the powder material of Comparative Example 1.

Next, a resin in which the powder material of Comparative Example 1 was embedded was polished to expose a particle cross section, and the cross-sectional structure was observed using an electron microscope. FIG. 4A and FIG. 4B are photographs with magnification factors of 800 and 5000, respectively, showing a particle cross section of the powder material 900 of Comparative Example 1. In the cross-sectional structure, the powder material of Comparative Example 1 had ceramics fine particles c and metal fine particles m deriving from the raw materials, but did not have the dendritic structure 1.

When the powder materials of Example 1 to Example 3 were observed using an electron microscope, three different forms of particles were included, as will be described below.

Figure 6A:
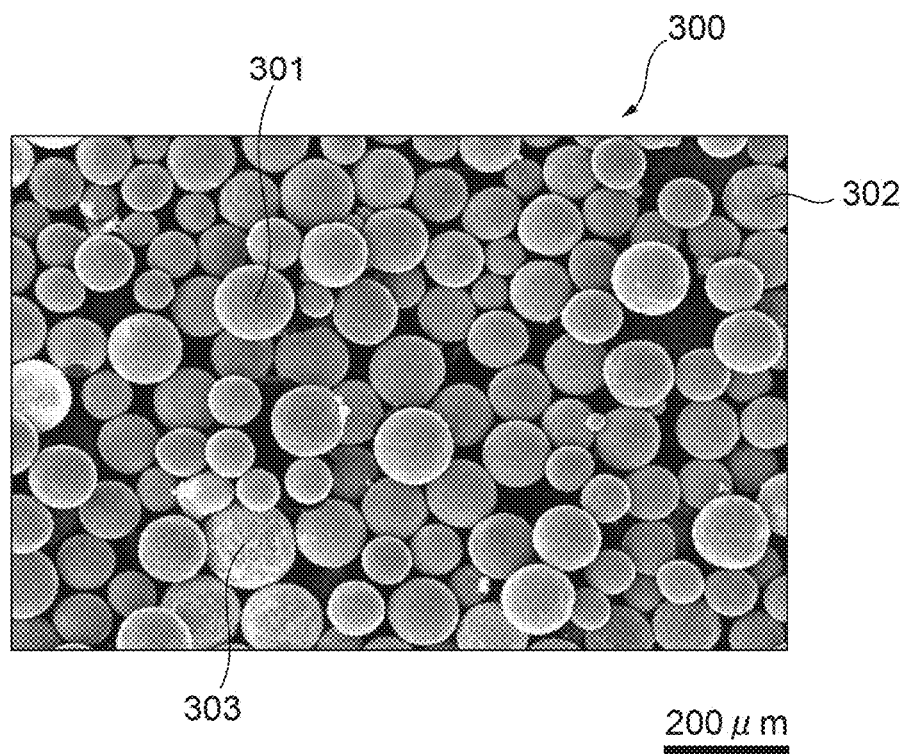
FIG. 6A is a magnified photograph of a powder material according to Example 3 of the present invention.
Figure 6B:
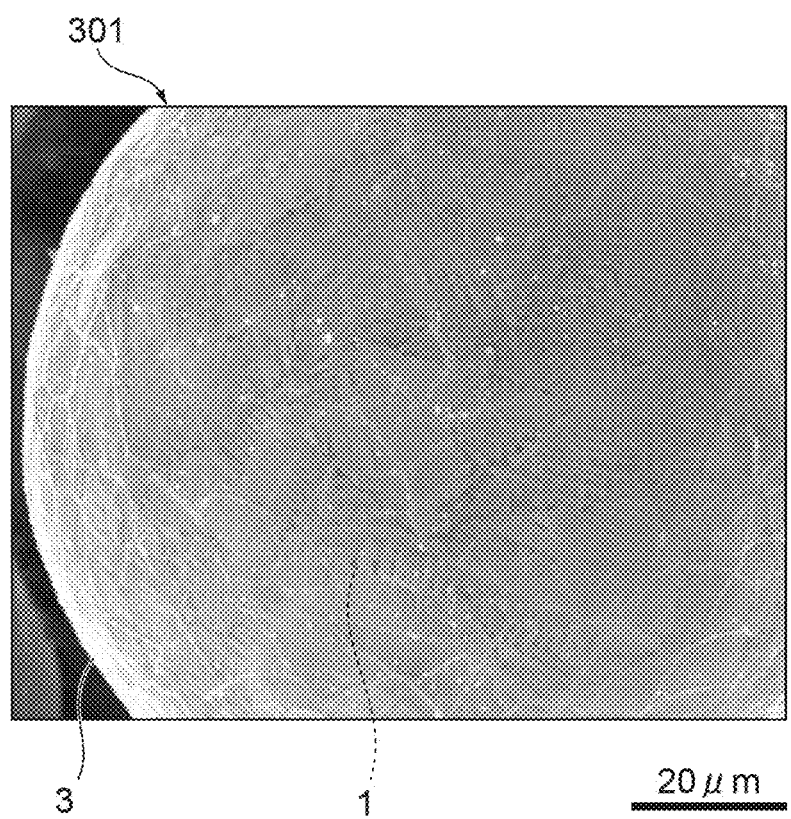
FIG. 6B is a magnified photograph showing the appearance of a particle of a first form of the powder material shown in FIG. 6A.
Figure 6C:
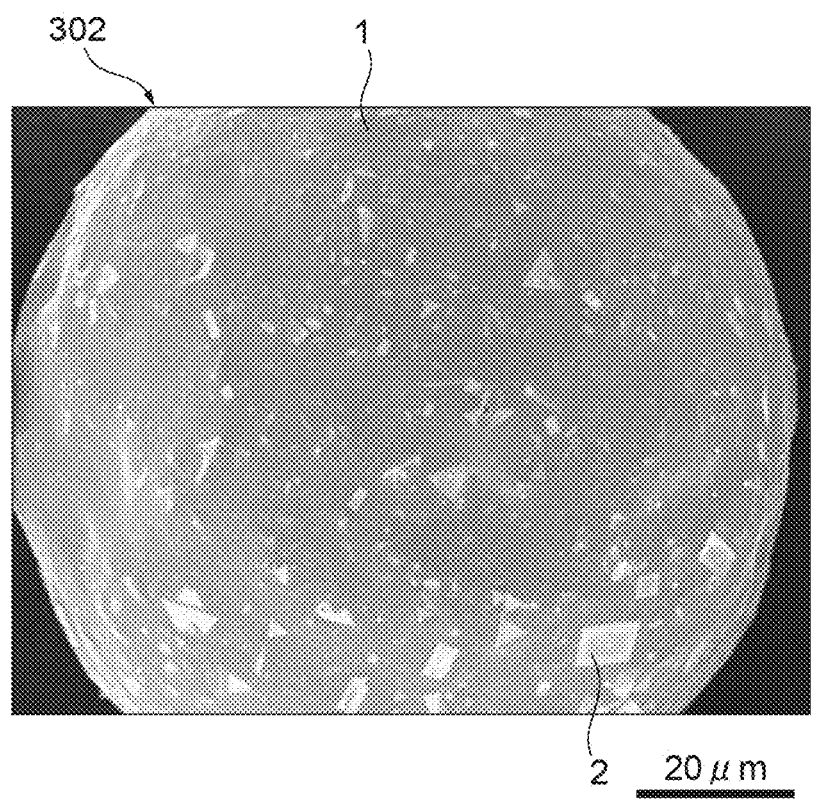
FIG. 6C is a magnified photograph showing the appearance of a particle of a second form of the powder material shown in FIG. 6A.
Figure 6D:
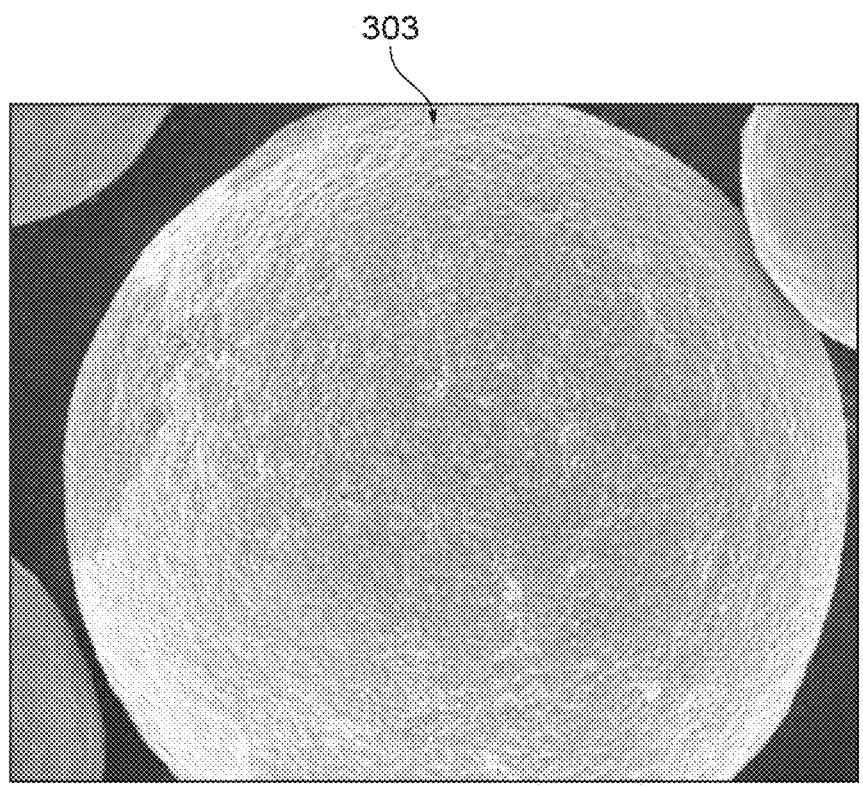
FIG. 6D is a magnified photograph showing the appearance of a particle of a third form of the powder material shown in FIG. 6A.

FIG. 6A is a magnified photograph of the powder material 300 of Example 3 with a magnification factor of 100. FIG. 6B is a magnified photograph with a magnification factor of 1000 showing the appearance of a particle 301 of a first form included in the powder material 300 of Example 3. FIG. 6C is a magnified photograph with a magnification factor is 1000 showing the appearance of a particle 302 of a second form included in the powder material 300 of Example 3. FIG. 6D is a magnified photograph with a magnification factor of 500 showing the appearance of the particle 303 of the third form included in the powder material 300 of Example 3.

The powder material 300 of Example 3 shown in FIG. 6A included the particles of the three different forms, including the particle 301 of the first form shown in FIG. 6B, the particle 302 of the second form shown in FIG. 6C, and the particle 303 of the third form shown in FIG. 6D.

Figure 7A:
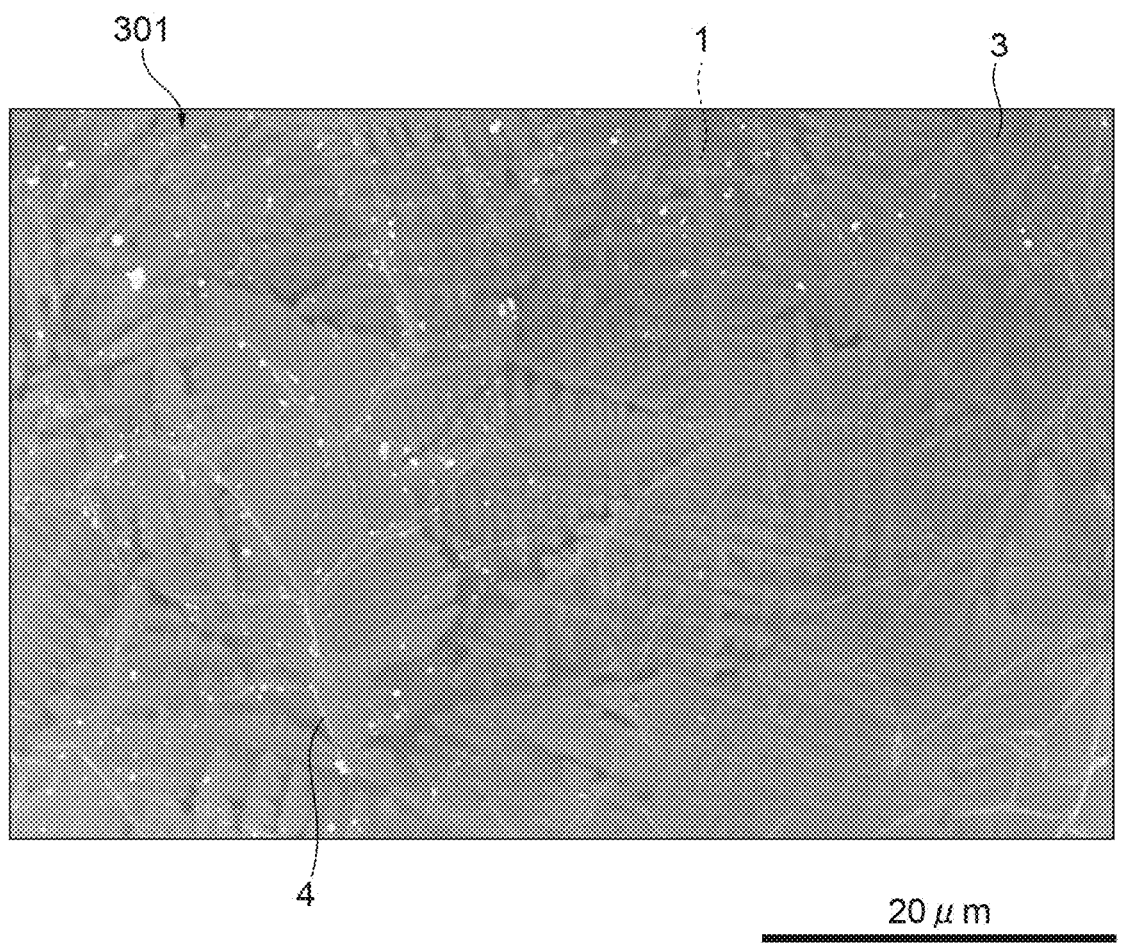
FIG. 7A is a magnified photograph showing an example of a surface structure of the particle of the first form shown in FIG. 6B.
Figure 7B:
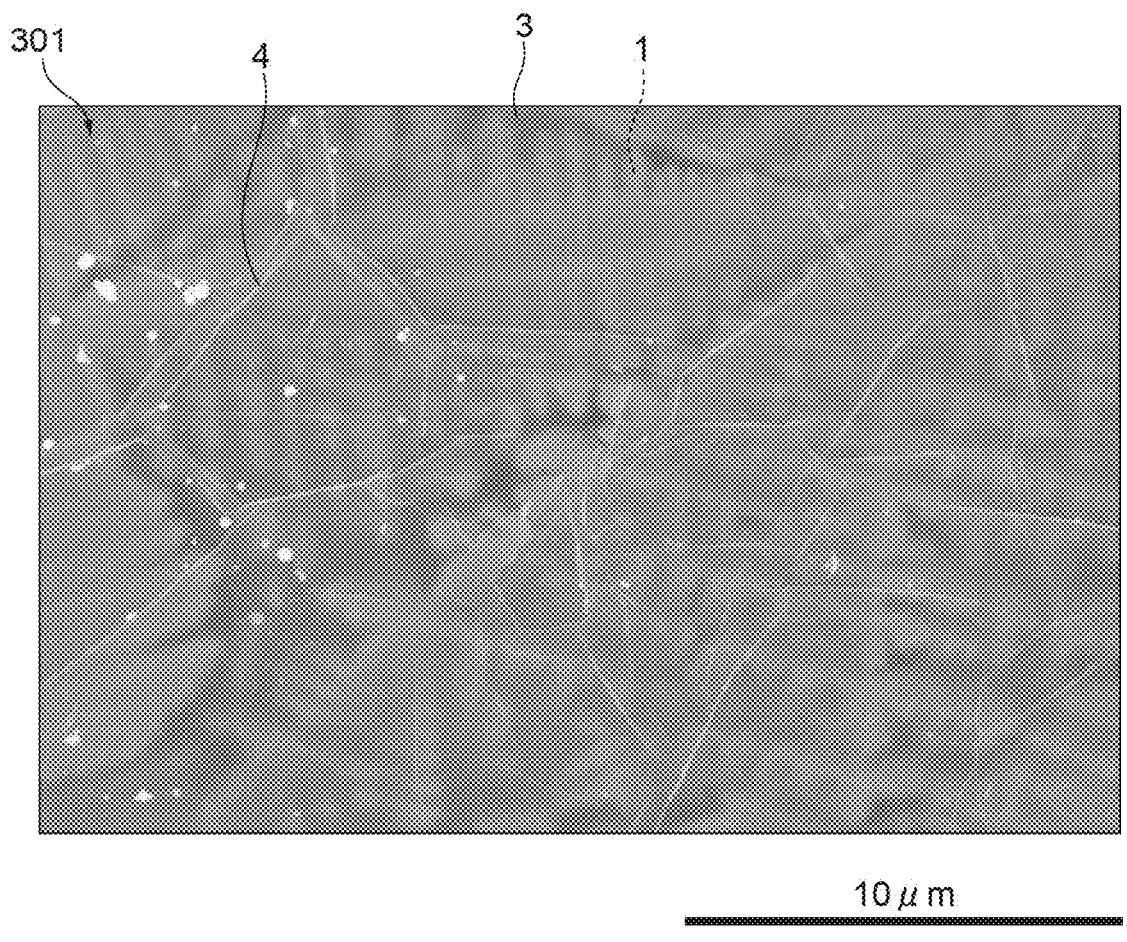
FIG. 7B is a magnified photograph showing an example of a surface structure of the particle of the first form shown in FIG. 6B.

FIG. 7A and FIG. 7B are magnified photographs showing an example of the surface structure of the particle 301 of the first form shown in FIG. 6B. In FIG. 7A, the magnification factor is 2000, and the photograph of FIG. 7B has a magnification factor of 5000. The particle 301 of the first form has the dendritic structure 1. The dendritic structure 1 has a cemented carbide composition or a cermet composition. However, the dendritic structure 1 does not include the ceramics particles 2 comprising a ceramics composition. In the illustrated example, the particle 301 of the first form not only has the dendritic structure 1 but also includes the outermost layer 3 covering the dendritic structure 1.

It is believed that the outermost layer 3 is a glassy film formed by the melting and solidification of ceramics, for example. The outermost layer 3 has on its surface linear portions 4 forming an irregular net-like pattern. The linear portions 4 form an irregular polygonal network on the surface of the outermost layer 3, and bulge from the other portions of the surface of the outermost layer 3 so as to form wrinkles in the surface of the outermost layer 3.

Figure 8A:
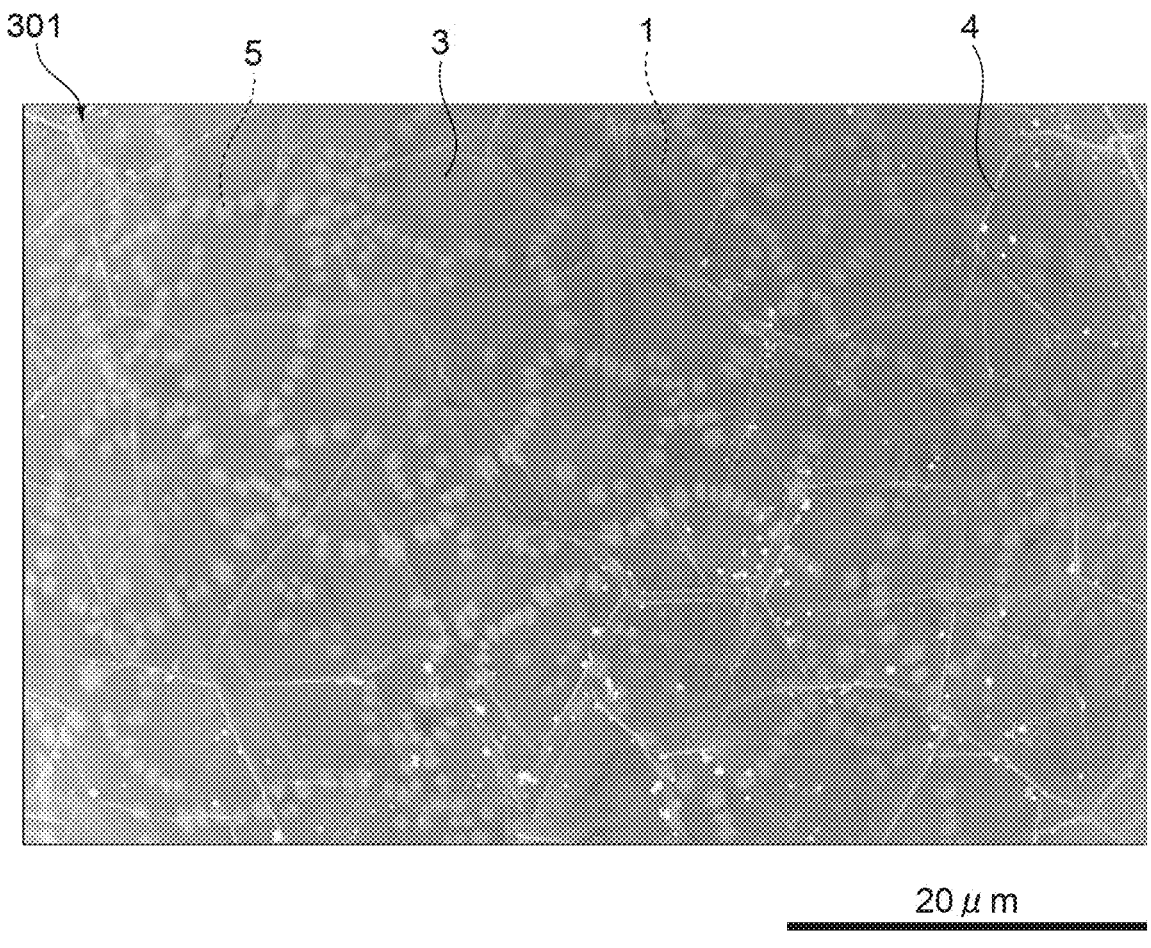
FIG. 8A is a magnified photograph showing another example of the surface structure of the particle of the first form shown in FIG. 6B.
Figure 8B:
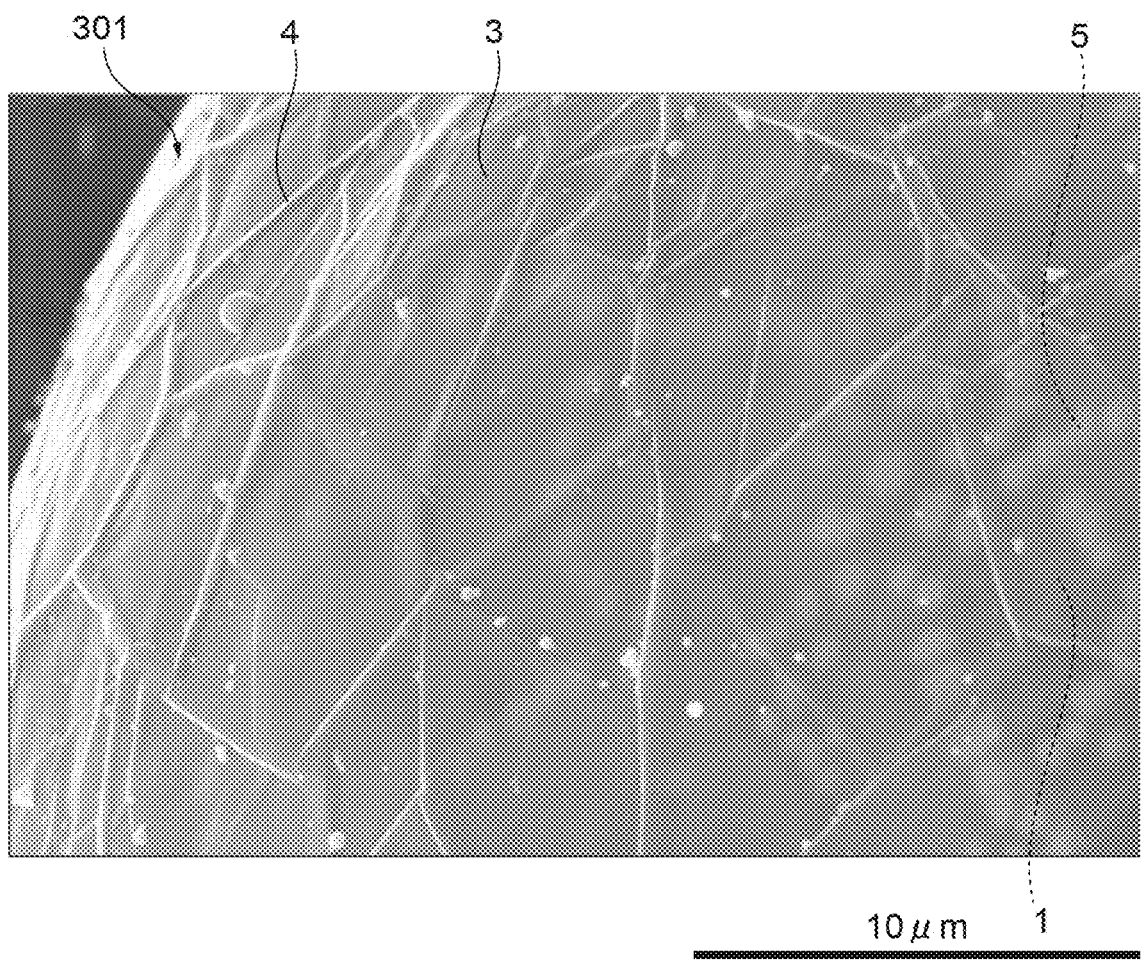
FIG. 8B is a magnified photograph showing another example of the surface structure of the particle of the first form shown in FIG. 6B.

FIG. 8A and FIG. 8B are magnified photographs showing another example of the surface structure of the particle 301 of the first form shown in FIG. 6B. In FIG. 8A, the magnification factor is 2000, and the photograph of FIG. 8B has a magnification factor of 5000. In the illustrated example, the particle 301 of the first form not only has the dendritic structure 1 but also includes minute particulate structures 5 and the outermost layer 3 covering the particulate structures 5 and the dendritic structure 1.

Not only the structure of each of the minute particulate structures 5 has an irregular polygonal shape, but also a plurality of particulate structures 5 are arranged so as to form an irregular polygonal net-like pattern and to trace grain boundaries. It is believed that the particulate structures 5 are growths of the core of the ceramics particles, for example. In this example, the particle 301 of the first form also has the outermost layer 3 and the linear portions 4 similar to those of the example shown in FIG. 7A and FIG. 7B.

The particle 302 of the second form shown in FIG. 6C has the dendritic structure 1. The dendritic structure 1 has a cemented carbide composition or a cermet composition, and further includes the ceramics particles 2 comprising a ceramics composition. The ceramics particles 2 have polygonal shapes.

Figure 9A:
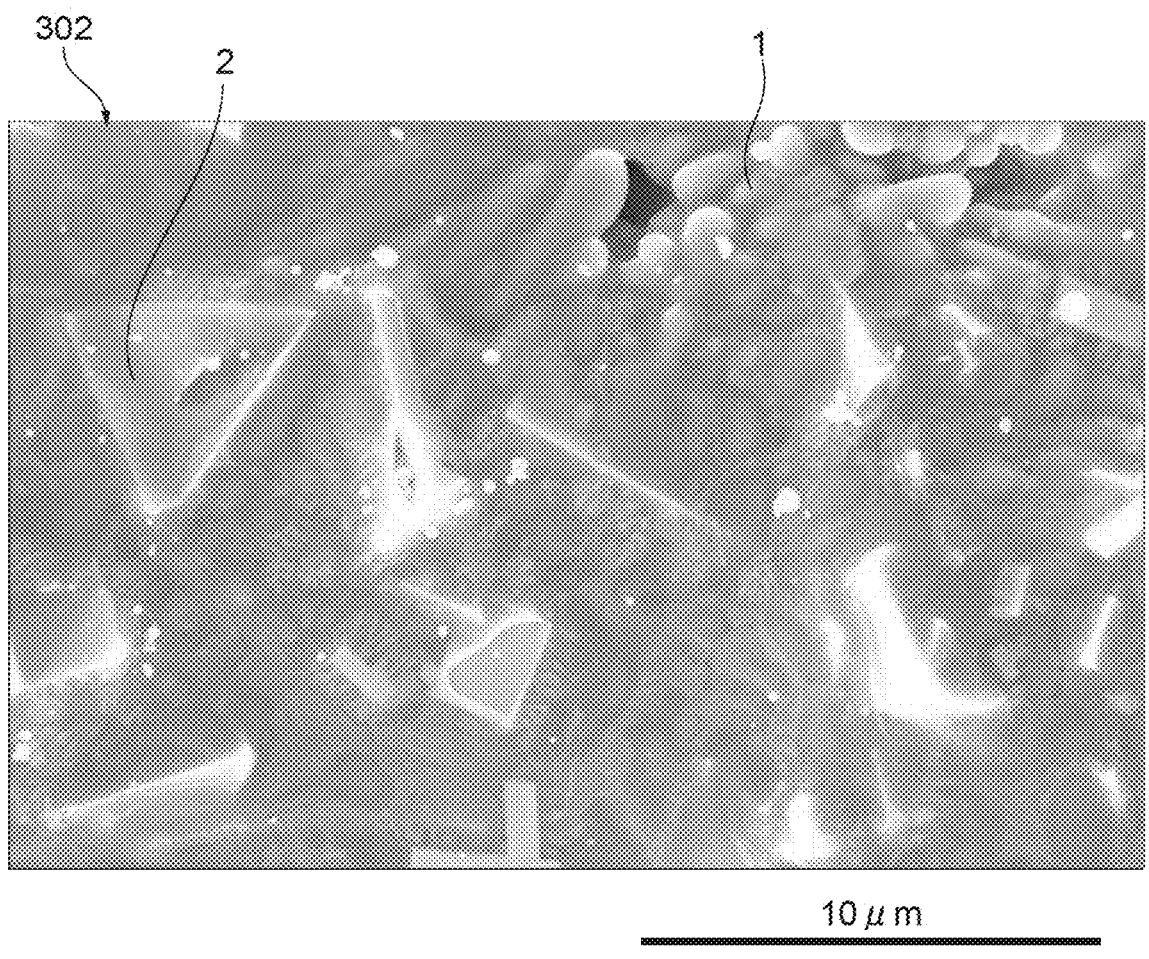
FIG. 9A is a magnified photograph showing an example of the surface structure of the particle of the second form shown in FIG. 6C.
Figure 9B:
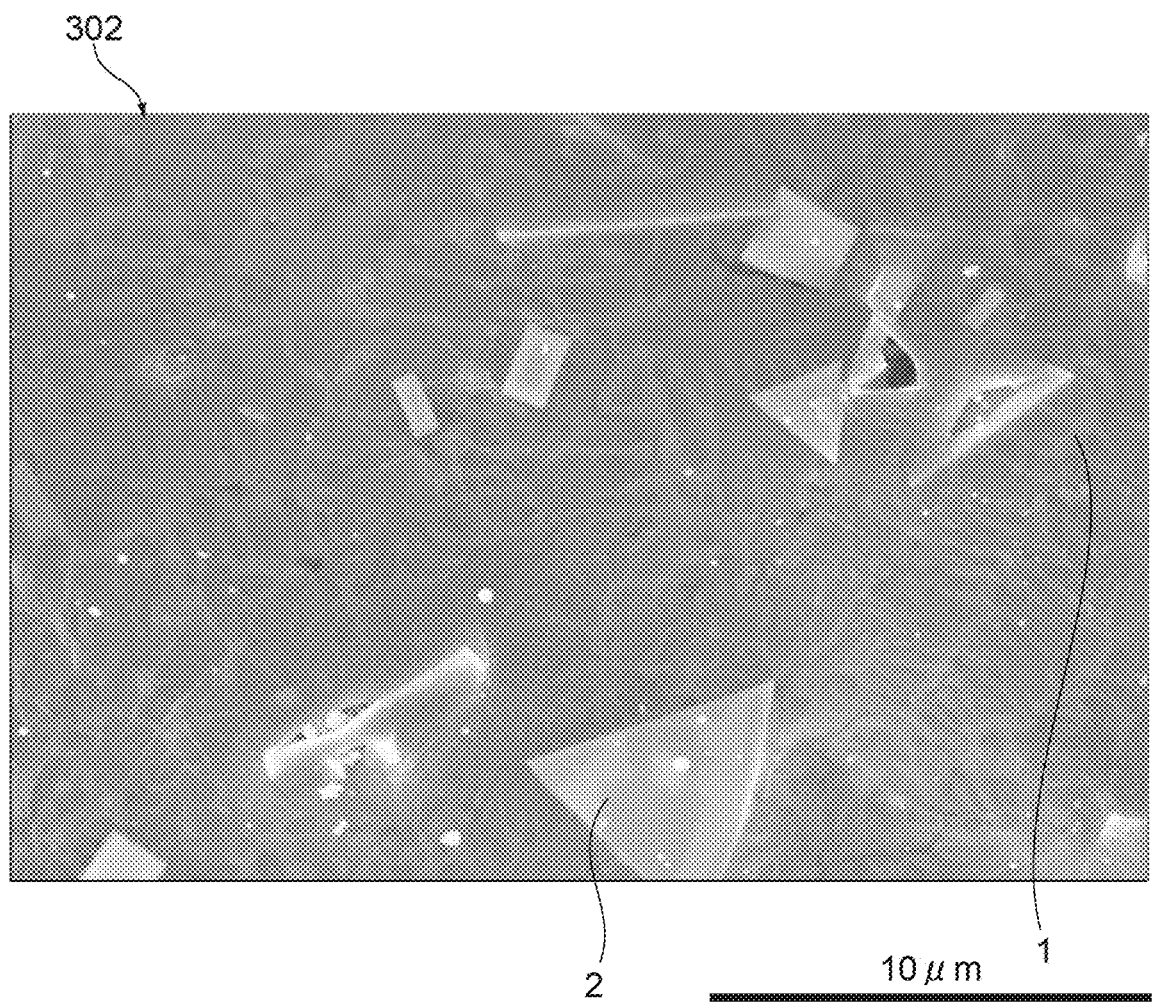
FIG. 9B is a magnified photograph showing an example of the surface structure of the particle of the second form shown in FIG. 6C.

FIG. 9A and FIG. 9B are magnified photographs each with a magnification factor of 5000, showing an example of the surface structure of the particle 302 of the second form shown in FIG. 6C. The surface structure of the particle 302 of the second form has, in the dendritic structure 1, WC particles which are the ceramics particles 2. In the particle 302 of the second form, something like a film was observed on nearly all powder surfaces.

Figure 10:
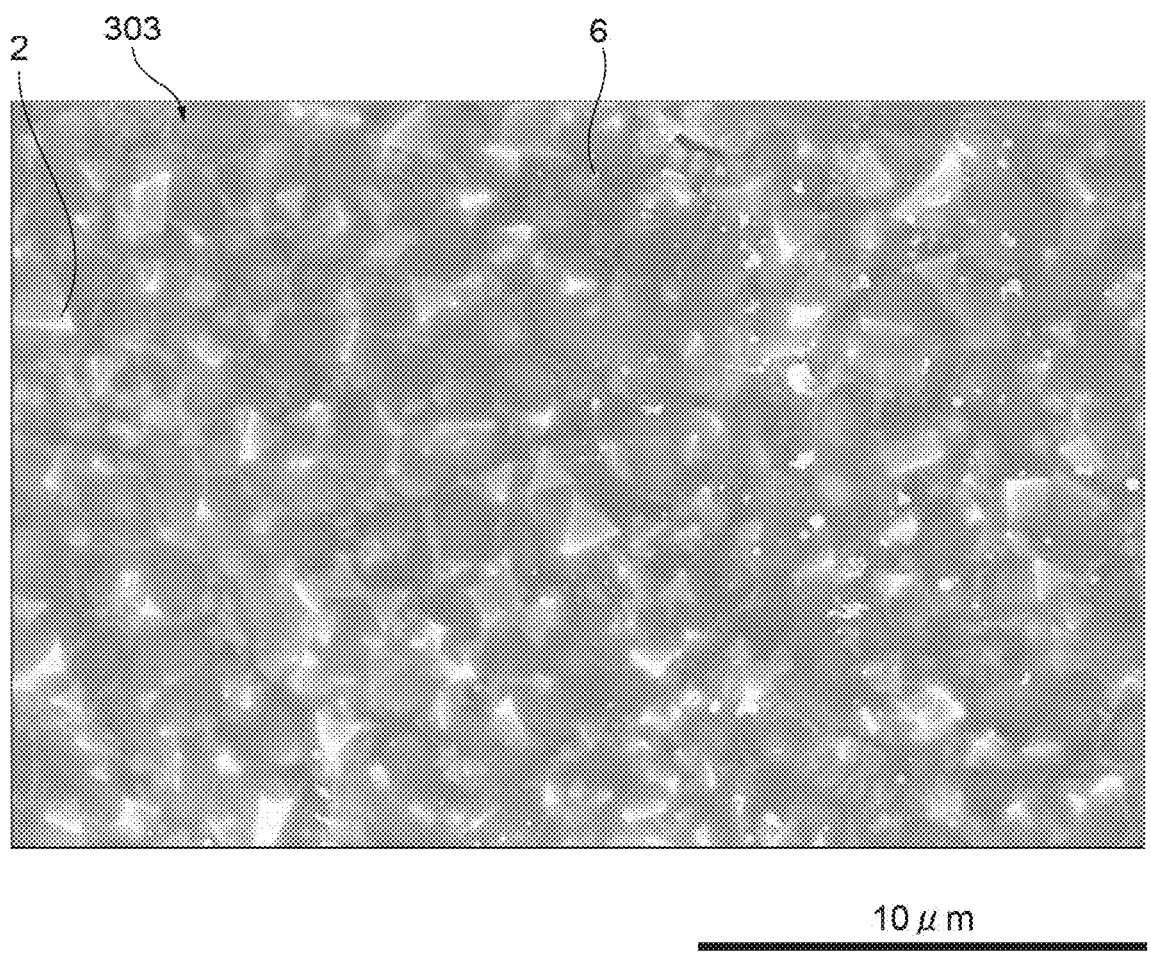
FIG. 10 is a magnified photograph showing an example of the surface structure of the particle of the third form shown in FIG. 6D.

The particle 303 of the third form shown in FIG. 6D had a morphology in which fine ceramics particles 2 were dispersed in the metal. FIG. 10 is a magnified photograph with a magnification factor of 5000, showing an example of the surface structure of the particle 303 of the third form shown in FIG. 6D. In the example shown, the surface structure of the particle 303 of the third form includes WC particles which are fine ceramics particles 2 dispersed in the surface, and a grain boundary product 6 produced in the matrix.

Next, the composition of the powder material of Example 2 was measured using an XPS measurement device. More specifically, initially, a resin in which the powder material of Example 2 was embedded was polished, exposing a particle cross section of the powder material.

Figure 11:
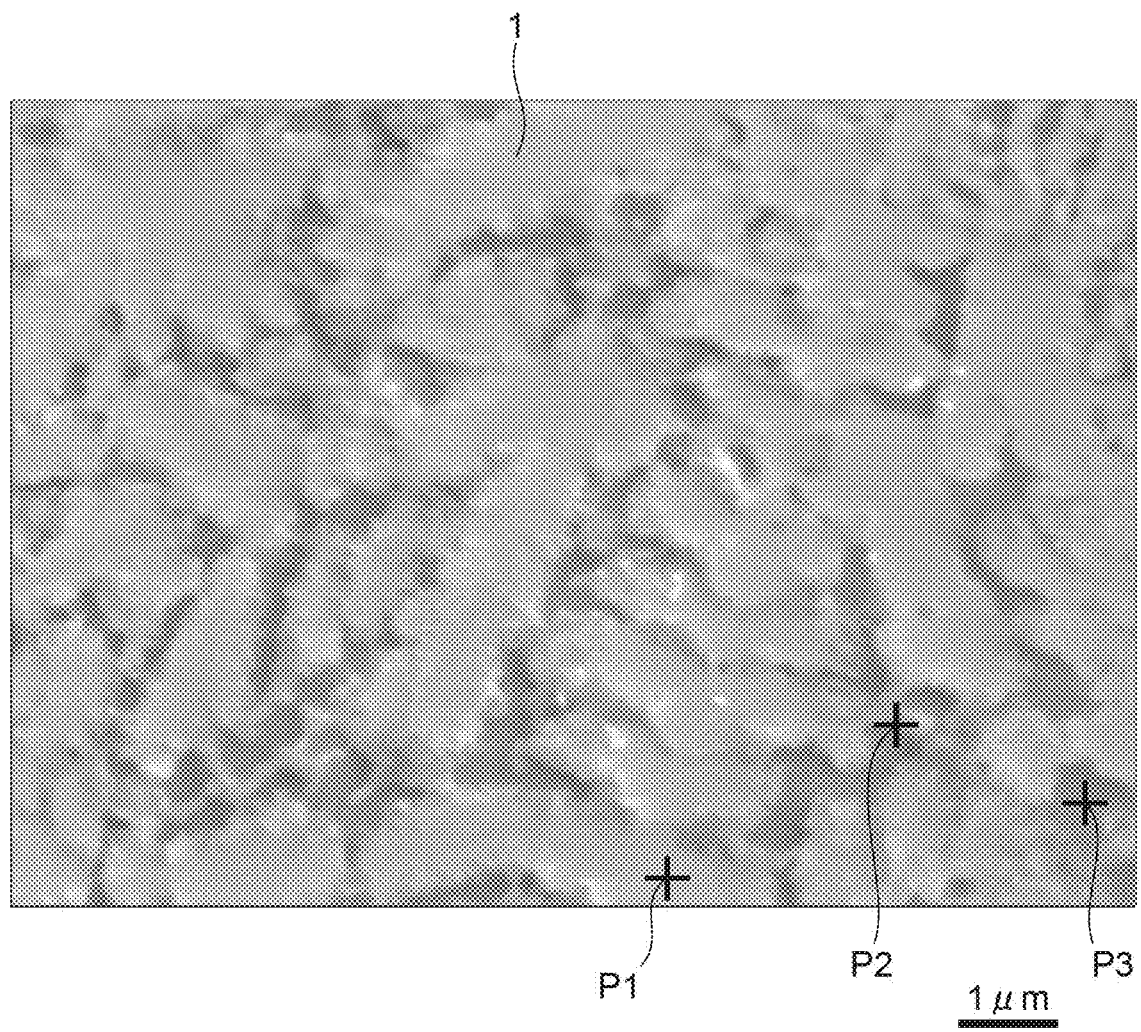
FIG. 11 is a photograph showing an example of a particle cross section of a first form of a powder material of Example 2.

FIG. 11 is a photograph with a magnification factor of 10000, showing an example of a cross section of the particle of the first form included in the powder material of Example 2. In the example shown, the powder material had the dendritic structure 1, where a dark-colored phase having low lightness in a secondary electron image (SEI) was present in the interface and gaps of the dendrite. Table 2 below shows the results of composition analysis at a first measurement point P1, a second measurement point P2, and a third measurement point P3 in the figure.

TABLE 2

| MEASUREMENT POINT | W[at %] | Co[at %] | O[at %] | C[at %] | Cr[at %] |
|---|---|---|---|---|---|
| P1 | 24.1 | 45.5 | 0.1 | 27.1 | 3.1 |
| P2 | 12.1 | 58.7 | 0.2 | 25.9 | 3.0 |
| P3 | 15.8 | 59.7 | 0.2 | 20.7 | 3.4 |

The dendritic structure 1 at the first measurement point P1 is a structure comprising Co—C—W—Cr. In the interface and the gap of the dendrite at the second measurement point P2 and the third measurement point P3, W and C are decreased and Co is increased. At the first measurement point P1 to the third measurement point P3, i.e., in any of the dendritic structure 1 and the interface and gap of the dendrite, W and C, which are ceramics component elements, are included by 10 [at %] or more. That is, the chemical composition of the dendritic structure 1 is a composition in which ceramics components and metal components are mixed.

Figure 12:
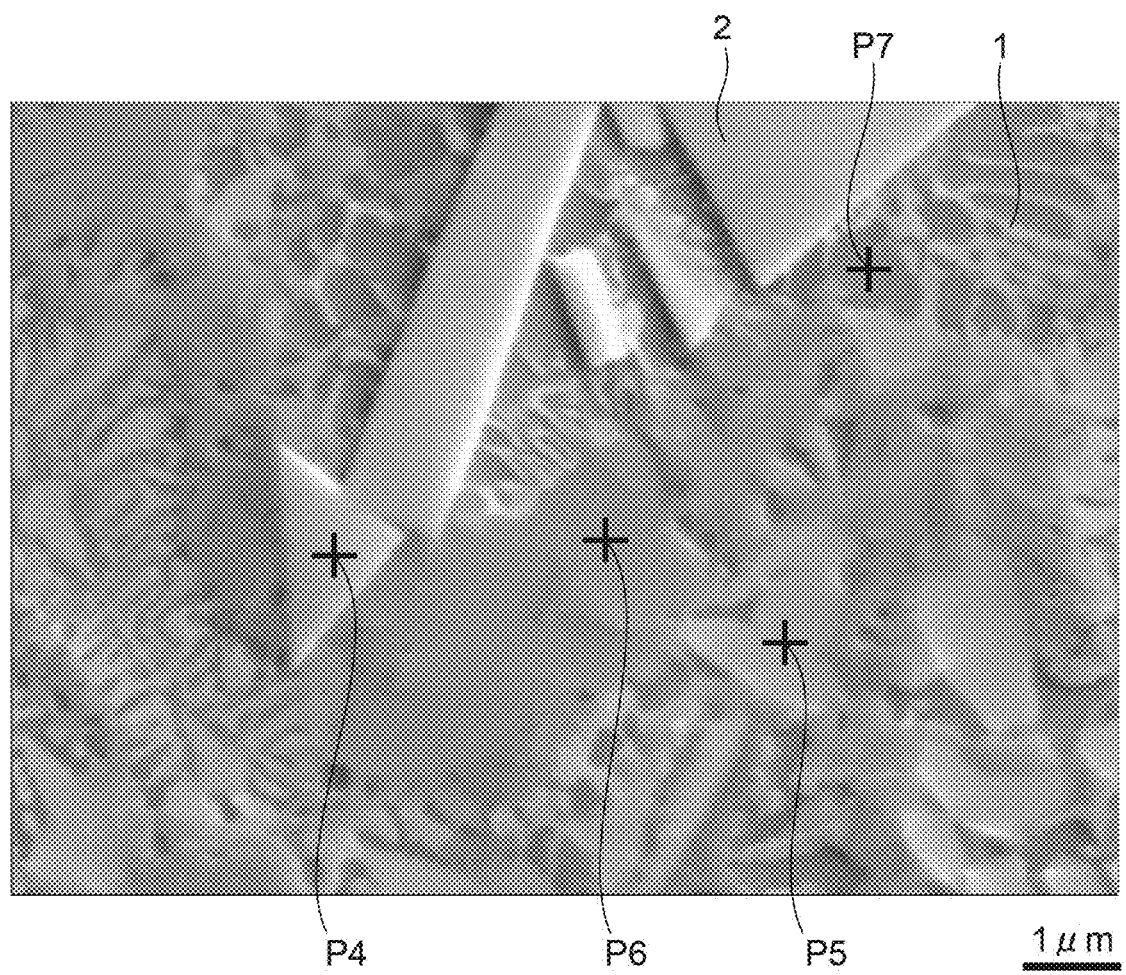
FIG. 12 is a photograph showing an example of a particle cross section of a second form of the powder material of Example 2.

FIG. 12 is a photograph with a magnification factor of 10000, showing an example of a cross section of the particle of the second form included in the powder material of Example 2. In the example shown, the powder material has the dendritic structure 1, where WC particles which are the ceramics particles 2 are included in the dendritic structure 1. That is, the dendritic structure 1 includes the ceramics particles 2 comprising a ceramics composition. In the example shown, in the powder material, a dark-colored phase having low lightness was present in an secondary electron image (SEI). Table 3 below shows the results of composition analysis at a fourth measurement point P4, a fifth measurement point P5, a sixth measurement point P6, and a seventh measurement point P7 in the figure.

TABLE 3

| MEASUREMENT POINT | W[at %] | Co[at %] | O[at %] | C[at %] | Cr[at %] |
|---|---|---|---|---|---|
| P4 | 49.4 | 3.9 | 0.0 | 45.6 | 1.0 |
| P5 | 21.0 | 48.9 | 0.2 | 26.6 | 3.1 |
| P6 | 11.8 | 55.3 | 0.0 | 29.9 | 2.9 |
| P7 | 7.2 | 82.4 | 0.1 | 7.5 | 2.6 |

In the ceramics particles 2 at the fourth measurement point P4 of the second form, W and C were detected at nearly 1:1, confirming that the particles were WC particles. The difference in lightness of the dendritic structure 1 is due to differences in the amount of W. The respective detected amounts were such that, in the order of decreasing lightness, W was 21.0 [at %] and C was 26.6 [at %] at the fifth measurement point P5, and W was 11.8 [at %] and C was 29.9 [at %] at the sixth measurement point P6. The dendritic structure 1 at each of the measurement points P5, P6 includes 10 [at %] or more of each of W and C. In the structure at the seventh measurement point P7 having low lightness in the dendrite gap, 82.4 [at %] of Co was detected, indicating that the structure is based on metal or alloy components.

Figure 13A:
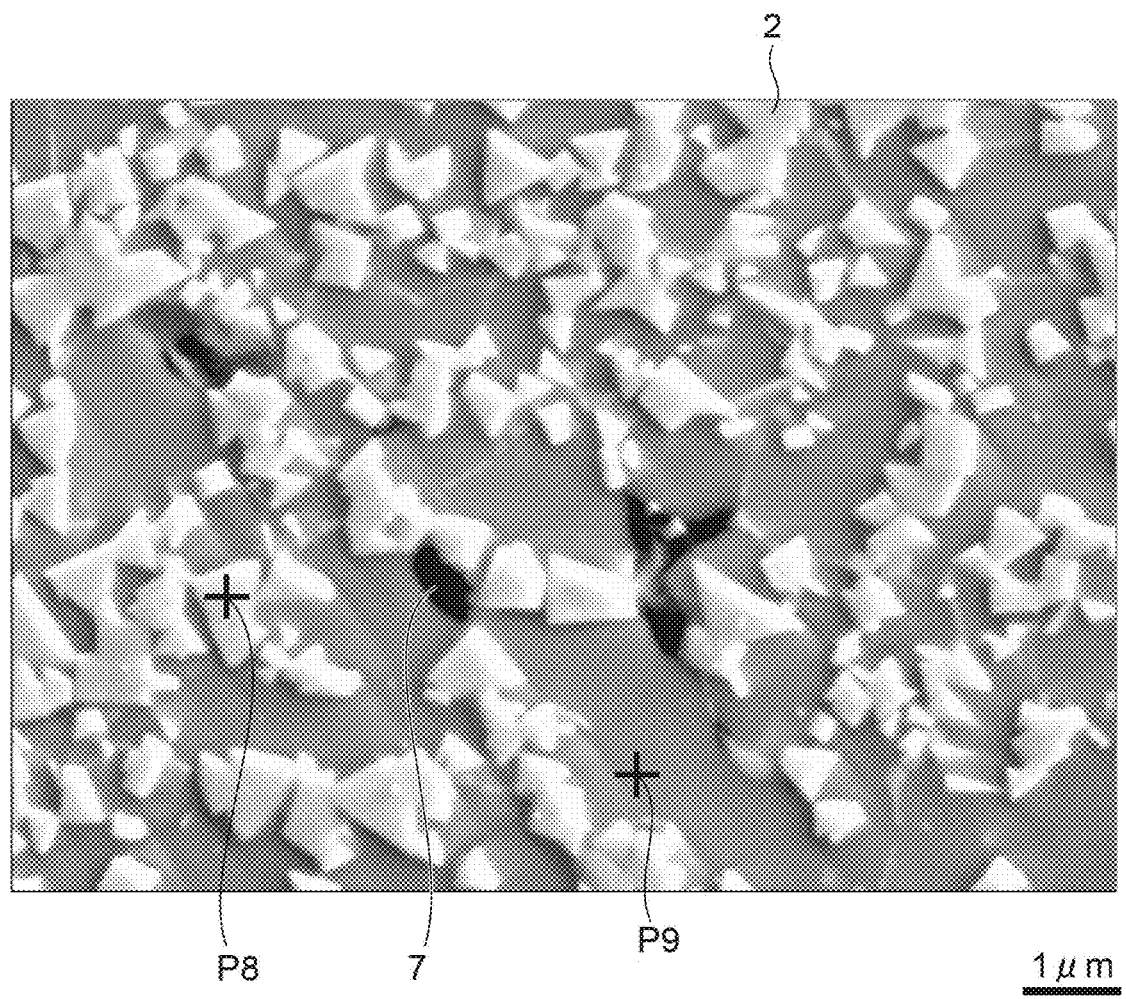
FIG. 13A is a photograph showing an example of a particle cross section of a fourth form of the powder material of Example 2.
Figure 13B:
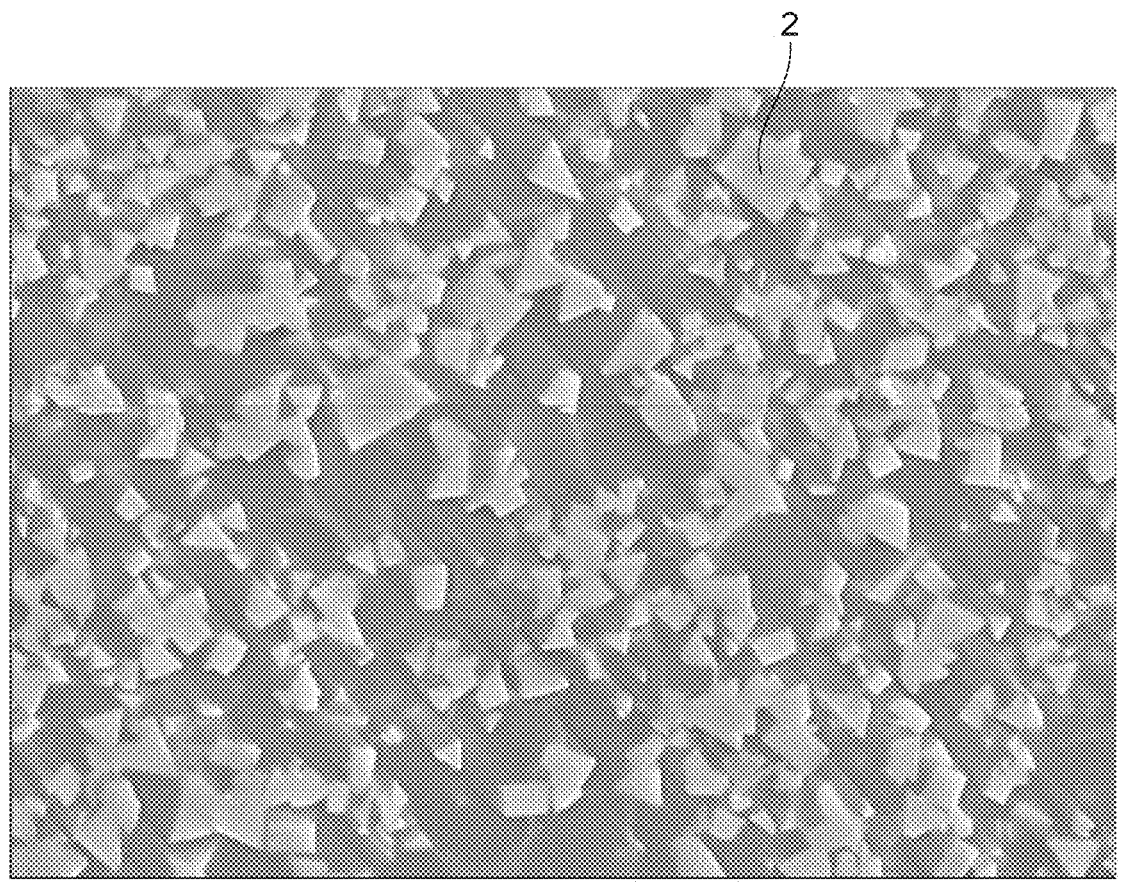
FIG. 13B is a photograph showing an example of a particle cross section of a fourth form of the powder material of Example 2.

FIG. 13A and FIG. 13B are photographs with magnification factors of 10000 and 5000, respectively, showing an example of a cross section of a particle of a fourth form included in the powder material of Example 2. In the example shown, the structure of the powder material includes WC particles which are the ceramics particles 2 in a Co-based matrix. In the figure, the black structures are free carbon 7. In the example shown, while the powder material does not have in its structure a clear dendritic structure 1, the WC particles which are the ceramics particles 2 are expanded compared to the powder material of Example 1 shown in FIG. 3, FIG. 4A, and FIG. 4B. Table 4 shows the results of composition analysis at an eighth measurement point P8 and a ninth measurement point P9 shown in FIG. 13A.

TABLE 4

| MEASUREMENT POINT | W[at %] | Co[at %] | O[at %] | C[at %] | Cr[at %] |
|---|---|---|---|---|---|
| P8 | 43.3 | 14.2 | 0.5 | 40.0 | 1.9 |
| P9 | 12.3 | 73.2 | 0.3 | 11.0 | 2.9 |

Referring to FIG. 13A, in the structure of the ceramics particles 2 at the eighth measurement point P8 having high lightness for the fourth form, W and C were detected at nearly 1:1, confirming that the particles were WC particles. Referring to FIG. 13A, in the structure at the ninth measurement point P9 in which the lightness of the particle of the fourth form was low, 73.2 [at %] of Co was detected, indicating that the structure is based on a metal or alloy component. The structure at each of the measurement points P8, P9 includes 10 [at %] or more of each of W and C.

The powder materials of Example 1 to Example 3 cannot be obtained simply by supplying a raw material powder into a plasma process device without manufacturing the powder material of Comparative Example 1. Thus, it was confirmed that the powder materials of Example 1 to Example 3 of the present invention are provided with a novel configuration different from that of conventional powder materials. When the electric power supplied (heat input) during PDR is increased, the ratio of the particles of the first form and the second form becomes greater than the ratio of the particles of the third form.

The particles (fourth form) having the outermost layer 3 were selected from the powder material of Example 2, and TEM images were obtained, as shown in FIG. 14A and FIG. 14B. The photograph of FIG. 14A has a magnification factor of 3000, and the photograph of FIG. 14B has a magnification factor of 700000. Further, the composition of the outermost layer 3 at a measurement point P10 indicated in FIG. 14A was measured by EDX analysis. Table 5 shows the results of analysis of the composition of the outermost layer 3.

TABLE 5

| MEASUREMENT POINT | W[at %] | Co[at %] | O[at %] | C[at %] | Cr[at %] |
|---|---|---|---|---|---|
| P10 | 0.6 | 0.3 | 0.6 | 98.4 | 0.1 |

As a result of the EDX analysis, it was confirmed that, as shown in Table 5, the outermost layer 3, which is the film on the uppermost surface of the particle 301 of the first form included in the powder material 300 of Example 3 shown in FIG. 7A and FIG. 7B, FIG. 8A and FIG. 8B, and FIG. 14A, was a film including 50 at % or more of carbon. It was also confirmed from FIG. 14B that there was a layered crystal structure along a tangential direction to the surface. Thus, it can be expected that flowability higher than that of conventional powder materials can be obtained.

REFERENCE SIGNS LIST

1 Dendritic structure
2 Ceramics particle
300 Powder material
S1 Raw material preparation step
S2 Raw material mixing step
S3 Granulation step
S4 Sintering step

The invention claimed is:

1. A powder material comprising a dendritic structure, wherein
    the dendritic structure has a cemented carbide composition or a cermet composition,
    the cemented carbide composition includes W and carbon, the balance being at least one selected from Fe, Ni, Co, and Cr,
    the cermet composition includes at least one of a Group 4 transition metal, a Group 5 transition metal, a Group 6 transition metal except for W, Al, and Si, and at least one of oxygen, carbon, and nitrogen, the balance being at least one selected from Fe, Ni, Co, and Cr, and
    the powder material further comprising an uppermost surface having a film including 50 at % or more of carbon.

2. The powder material according to claim 1, wherein the powder material includes a dendritic structure and ceramics particles.

3. The powder material according to claim 2, wherein the ceramics particles have a polygonal shape.

4. The powder material according to claim 1 wherein the cemented carbide composition or the cermet composition contains at least 5 at % or more of at least one of a Group 4 transition metal, a Group 5 transition metal, a Group 6 transition metal, Si, and Al, and at least one of oxygen, carbon, and nitrogen.

5. The powder material according to claim 4, wherein the cemented carbide composition or the cermet composition includes at least one of W, Ti, and Si and carbon, the balance being at least one selected from Fe, Cr, Ni, and Co.

6. The powder material according to claim 1, wherein the film includes a layered crystal structure along a tangential direction to a surface.

7. The powder material according to claim 6, wherein the film covers the dendritic structure.

8. The powder material according to claim 1, wherein the film covers the dendritic structure.

9. The powder material according to claim 1, wherein the powder material has a particle size of 10 μm or more and 200

μm or less, and a flowability of not more than 25 sec/50 g in accordance with JIS Z 2502.

10. An additive manufacturing powder material comprising the powder material according to claim 1.

11. The powder material according to claim 1, wherein the powder material has a particle size of 10 μm or more and 200 μm or less, and a flowability of not more than 25 sec/50 g in accordance with JIS Z 2502.

12. An additive manufacturing powder material comprising the powder material according to claim 1.

13. A method of manufacturing the powder material according to claim 1, the method comprising:
- a raw material mixing step of obtaining a mixture by wet-mixing, as raw materials, ceramics fine particles, metal or alloy fine particles, and wax;
- a granulation step of producing mixture particles by granulation by atomizing and drying the mixture;
- a sintering step of debinding a powder of the mixture particles and then sintering the powder at a sintering temperature higher than or equal to 1000° C.; and
- a high-temperature processing step of causing all or some of the mixture particle powder solidified in the sintering step to be instantaneously melted and solidified by thermal plasma-droplet-refining.

14. A powder material comprising a cemented carbide composition or a cermet composition, wherein
- the cemented carbide composition includes W and carbon, the balance being at least one selected from Fe, Ni, Co, and Cr,
- the cermet composition includes at least one of a Group 4 transition metal, a Group 5 transition metal, a Group 6 transition metal except for W, Al, and Si, and at least one of oxygen, carbon, and nitrogen, the balance being at least one selected from Fe, Ni, Co, and Cr, and
- the powder material has an uppermost surface having a film including 50 at % or more of carbon.

15. The powder material according to claim 14, wherein the cemented carbide composition or the cermet composition contains at least 5 at % or more of at least one of a Group 4 transition metal, a Group 5 transition metal, a Group 6 transition metal, Si, and Al, and at least one of oxygen, carbon, and nitrogen.

16. The powder material according to claim 15, wherein the cemented carbide composition or the cermet composition includes at least one of W, Ti, and Si and carbon, the balance being at least one selected from Fe, Cr, Ni, and Co.

* * * * *